(12) United States Patent
Ito et al.

(10) Patent No.: US 11,118,549 B2
(45) Date of Patent: Sep. 14, 2021

(54) COVER FOR FUEL TANK

(71) Applicant: AISAN KOGYO KABUSHIKI KAISHA, Obu (JP)

(72) Inventors: Satoshi Ito, Toyohashi (JP); Koji Yoshida, Commerce Township, MI (US); Kensuke Niwa, Nagoya (JP); Masashi Go, Nagoya (JP); Takashi Kanie, Kariya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 17/042,222

(22) PCT Filed: Feb. 14, 2019

(86) PCT No.: PCT/JP2019/005284
§ 371 (c)(1),
(2) Date: Sep. 28, 2020

(87) PCT Pub. No.: WO2019/187739
PCT Pub. Date: Oct. 3, 2019

(65) Prior Publication Data
US 2021/0025360 A1 Jan. 28, 2021

(30) Foreign Application Priority Data

Mar. 28, 2018 (JP) .............................. JP2018-061625

(51) Int. Cl.
*F02M 37/10* (2006.01)
*F02M 37/00* (2006.01)
(Continued)

(52) U.S. Cl.
CPC .......... *F02M 37/106* (2013.01); *F02M 37/10* (2013.01); *B60K 2015/03171* (2013.01);
(Continued)

(58) Field of Classification Search
CPC .......... B60K 2015/03171; B60K 2015/03453; B60K 2015/03467
See application file for complete search history.

(56) References Cited

U.S. PATENT DOCUMENTS 4,869,225 A * 9/1989 Nagata ................. F02M 37/106
123/509
5,482,444 A * 1/1996 Coha .................... F02M 37/103
248/638
(Continued)

FOREIGN PATENT DOCUMENTS

| JP | S5773365 U | 5/1982 |
| JP | 2003172219 A | 6/2003 |

(Continued)

OTHER PUBLICATIONS

PCT/JP2019/005284 International Preliminary Report on Patentability dated Oct. 1, 2020 (3 p.).

(Continued)

Primary Examiner — Kevin R Steckbauer
(74) Attorney, Agent, or Firm — Conley Rose, P.C.

(57) ABSTRACT

A cover for a fuel tank includes a flange unit configured to close an opening of the fuel tank and a joint member connected to the flange unit. The joint member is movable in an upward/downward direction. The flange unit includes a side tubular portion extending in the upward/downward direction. The joint member includes a support column portion extending in the upward/downward direction. The support column portion is movably disposed in the side tubular portion so as to be movable in the upward/downward direction. The support column portion is connected to the side tubular portion by a snap-fit so as to be movable and suspendable in the upward/downward direction.

4 Claims, 15 Drawing Sheets

(51) Int. Cl.
 *B60K 15/03* (2006.01)
 *B60K 15/077* (2006.01)
(52) U.S. Cl.
 CPC .............. *B60K 2015/03453* (2013.01); *B60K 2015/03467* (2013.01); *B60K 2015/0775* (2013.01); *F02M 37/0082* (2013.01); *F02M 37/0088* (2013.01)

(56) References Cited

U.S. PATENT DOCUMENTS

| | | | | |
|---|---|---|---|---|
| 6,752,129 | B2* | 6/2004 | Isozaki | F02M 37/103 123/509 |
| 6,923,164 | B1* | 8/2005 | Mitsudou | F02M 37/50 123/509 |
| 7,108,487 | B2* | 9/2006 | Koba | F02M 37/103 417/360 |
| 7,124,748 | B2* | 10/2006 | Gaffield | F02M 37/0094 123/509 |
| 7,237,538 | B2* | 7/2007 | Perruchot | F02M 37/106 123/509 |
| 7,389,768 | B2* | 6/2008 | Hayakawa | F02M 37/106 123/509 |
| 7,415,974 | B2* | 8/2008 | Akiba | F02M 37/106 123/509 |
| 7,472,693 | B2* | 1/2009 | Izutani | F02M 37/34 123/509 |
| 7,520,270 | B2* | 4/2009 | Uhara | F02M 37/106 123/509 |
| 8,689,827 | B2* | 4/2014 | Okazono | B01D 35/26 137/565.34 |
| 9,328,704 | B2* | 5/2016 | Okazono | B01D 35/027 |
| 9,539,893 | B2* | 1/2017 | Hsu | B60K 15/067 |
| 9,803,594 | B2* | 10/2017 | Ishitoya | F02M 37/106 |
| 10,012,189 | B2* | 7/2018 | Kondo | F02M 37/103 |
| 10,054,089 | B2* | 8/2018 | Takahashi | F02M 37/0029 |
| 10,215,614 | B2* | 2/2019 | Flynn | G01F 23/683 |
| 10,247,597 | B2* | 4/2019 | Flynn | B60K 15/03 |
| 10,436,161 | B2* | 10/2019 | Kim | F02M 37/14 |
| 10,443,552 | B2* | 10/2019 | Fukuoka | B01D 29/11 |
| 10,544,762 | B2* | 1/2020 | Fukui | F02M 37/106 |
| 10,634,102 | B2* | 4/2020 | Soreo | B01D 35/0273 |
| 10,641,218 | B2* | 5/2020 | Fujiseki | F02M 37/103 |
| 10,648,436 | B2* | 5/2020 | Adachi | F02M 37/0082 |
| 10,669,976 | B2* | 6/2020 | Fukuoka | F02M 37/0082 |
| 10,690,096 | B2* | 6/2020 | Hayashi | F02B 37/025 |
| 10,704,514 | B2* | 7/2020 | Kobayashi | F02M 37/103 |
| 10,794,342 | B2* | 10/2020 | Maruyama | F02M 37/103 |
| 10,850,606 | B2* | 12/2020 | Niwa | F02M 37/0076 |
| 10,865,750 | B2* | 12/2020 | Soreo | B01D 35/0273 |
| 10,907,593 | B2* | 2/2021 | Higashi | F02M 37/103 |
| 2001/0001963 | A1* | 5/2001 | Murakoshi | F02M 37/0082 137/565.34 |
| 2003/0106537 | A1* | 6/2003 | Isozaki | F02M 37/103 123/509 |
| 2004/0037714 | A1* | 2/2004 | Koba | F02M 37/103 417/360 |
| 2004/0074995 | A1* | 4/2004 | Okada | B01D 35/26 239/533.1 |
| 2004/0163630 | A1* | 8/2004 | Powell | F02M 37/106 123/509 |
| 2005/0155583 | A1* | 7/2005 | Mitsudou | F02M 37/50 123/509 |
| 2005/0166974 | A1* | 8/2005 | Hashiguchi | F02M 37/106 137/571 |
| 2005/0217733 | A1* | 10/2005 | Hayakawa | F02M 37/106 137/565.17 |
| 2006/0130815 | A1* | 6/2006 | Gaffield | F02M 37/103 123/509 |
| 2007/0056567 | A1* | 3/2007 | Perruchot | F02M 37/106 123/509 |
| 2007/0215115 | A1* | 9/2007 | Hazama | F02D 41/3082 123/458 |
| 2009/0028690 | A1* | 1/2009 | Kawajiri | F02M 37/18 415/55.1 |
| 2011/0168134 | A1* | 7/2011 | Lim | F02M 37/106 123/509 |
| 2012/0060948 | A1* | 3/2012 | Okazono | F04B 23/021 137/565.17 |
| 2015/0330341 | A1* | 11/2015 | Rossi | B60K 15/03 137/565.01 |
| 2016/0238172 | A1* | 8/2016 | Ishitoya | F02M 37/106 |
| 2017/0241386 | A1* | 8/2017 | Mason | F02M 37/46 |
| 2017/0248106 | A1* | 8/2017 | Niwa | F02M 37/103 |
| 2017/0268470 | A1* | 9/2017 | Murakoshi | F02M 37/103 |
| 2017/0268471 | A1* | 9/2017 | Fukui | F02M 37/10 |
| 2017/0276105 | A1* | 9/2017 | Kondo | F02M 37/0017 |
| 2017/0314522 | A1* | 11/2017 | Takahashi | F02M 55/04 |
| 2017/0328318 | A1* | 11/2017 | Fukui | F02M 37/106 |
| 2018/0031408 | A1* | 2/2018 | Flynn | G01F 23/30 |
| 2018/0328323 | A1* | 11/2018 | Fukuoka | F02M 37/50 |
| 2019/0017474 | A1* | 1/2019 | Adachi | F02M 37/0052 |
| 2019/0024615 | A1* | 1/2019 | Hayashi | F02M 37/0052 |
| 2019/0024617 | A1* | 1/2019 | Fukui | F02M 37/103 |
| 2019/0032614 | A1* | 1/2019 | Fukuoka | F02M 37/0082 |
| 2019/0047405 | A1* | 2/2019 | Niwa | B60K 15/03504 |
| 2019/0078541 | A1* | 3/2019 | Kobayashi | F02M 37/0017 |
| 2019/0136809 | A1* | 5/2019 | Fujiseki | F02M 37/106 |
| 2019/0136810 | A1* | 5/2019 | Niwa | F02M 37/50 |
| 2019/0211785 | A1* | 7/2019 | Akiba | F02M 37/00 |
| 2019/0331073 | A1* | 10/2019 | Higashi | F02M 37/50 |
| 2020/0080524 | A1* | 3/2020 | Soreo | F02M 37/106 |
| 2020/0080525 | A1* | 3/2020 | Soreo | F04B 49/04 |
| 2020/0173407 | A1* | 6/2020 | Soreo | F02M 37/10 |
| 2021/0033051 | A1* | 2/2021 | Ito | F16M 13/022 |
| 2021/0033053 | A1* | 2/2021 | Hayashi | F02M 37/10 |

FOREIGN PATENT DOCUMENTS

| | | |
|---|---|---|
| JP | 2007077972 A | 3/2007 |
| JP | 2014141894 A | 8/2014 |
| JP | 2016089746 A | 5/2016 |
| JP | 2016151224 A | 8/2016 |
| JP | 2017166472 A | 9/2017 |
| JP | 2017172488 A | 9/2017 |
| JP | 2017194005 A | 10/2017 |

OTHER PUBLICATIONS

English Translation of PCT/JP2019/005284 International Preliminary Report on Patentability dated Oct. 1, 2020 (5 p.).
PCT/JP2019/005284 International Search Report and Written Opinion dated Apr. 9, 2019 (9 p.).
PCT/JP2019/005284 Article 34 Amendment dated Nov. 27, 2019 (8 p.).
Japanese Office Action dated May 10, 2021, for Japanese Application No. 2018-061625 (5 p.).
English Translation of Japanese Office Action dated May 10, 2021, for Japanese Application No. 2018-061625 (5 p.).
Japanese Office Action dated Mar. 15, 2021, for Japanese Application No. 2018-061625 (4 p.).
English Translation of Japanese Office Action dated Mar. 15, 2021, for Japanese Application No. 2018-061625 (4 p.).

* cited by examiner

COVER FOR FUEL TANK

CROSS-REFERENCE TO RELATED APPLICATIONS

The present application is a 35 U.S.C. § 371 national stage application of, and claims the benefit of, PCT Application No. PCT/JP2019/005284 filed Feb. 14, 2019, which claims priority to Japanese Patent Application No. 2018-061625 filed Mar. 28, 2018, each of which is incorporated herein by reference in its entirety for all purposes.

STATEMENT REGARDING FEDERALLY SPONSORED RESEARCH OR DEVELOPMENT

Not applicable.

BACKGROUND

The present disclosure generally relates to a cover for a fuel tank.

A fuel supply device for supplying fuel within a fuel tank installed in a vehicle, such as an automobile or the like, to an internal combustion engine (i.e., an engine) is described, for example, in Japanese Laid-Open Patent Publication No. 2017-194005. As described in Japanese Laid-Open Patent Publication No. 2017-194005, a cover for a fuel tank has a cover member configured to close an opening of the fuel tank and a connecting member connected to the cover member so as to be movable in the upward/downward direction. Tubular portions extending in the upward/downward direction are formed on the cover member. Columnar portions extending in the upward/downward direction are formed on the connecting member. The columnar portions are inserted in the tubular portions so as to be movable in the upward/downward direction.

SUMMARY

In one aspect of this disclosure, a fuel tank disclosed herein includes a cover member configured to close an opening of the fuel tank, and a connecting member configured to be connected to the cover member so as to be movable in an upward/downward direction. A tubular portion extending in the upward/downward direction is formed at the cover member. A columnar portion extending in the upward/downward direction is formed at the connecting member. The columnar portion is inserted into the tubular portion so as to be movable in the upward/downward direction. The columnar portion is connected to the tubular portion by a snap-fit so as to be movable and suspendable in the upward/downward direction.

Accordingly, embodiments described herein offer the potential to improve the assembly of the connecting member that is connected to the cover member so as to be movable and suspendable in the upward/downward direction.

DETAILED DESCRIPTION

As previously described, Japanese Laid-Open Patent Publication No. 2017-194005 discloses tubular portions extending in the upward/downward direction on the cover member and columnar portions extending in the upward/downward direction on the connecting member. The columnar portions are inserted in the tubular portions so as to be movable in the upward/downward direction. However, Japanese Laid-Open Patent Publication No. 2017-194005 does not discloses a configuration for connecting the columnar portion of the connecting member to the tubular portion of the cover member so as to be movable and suspendable in the upward/downward direction. Thus, it is suspected that much labor is required for attaching the connecting member to the cover member, and that assembly of the connecting member is challenging. Therefore, there has been a need for improved cover for a fuel tank.

Hereinafter, embodiments of the techniques disclosed herein will be described with reference to the drawings.

Figure 1:
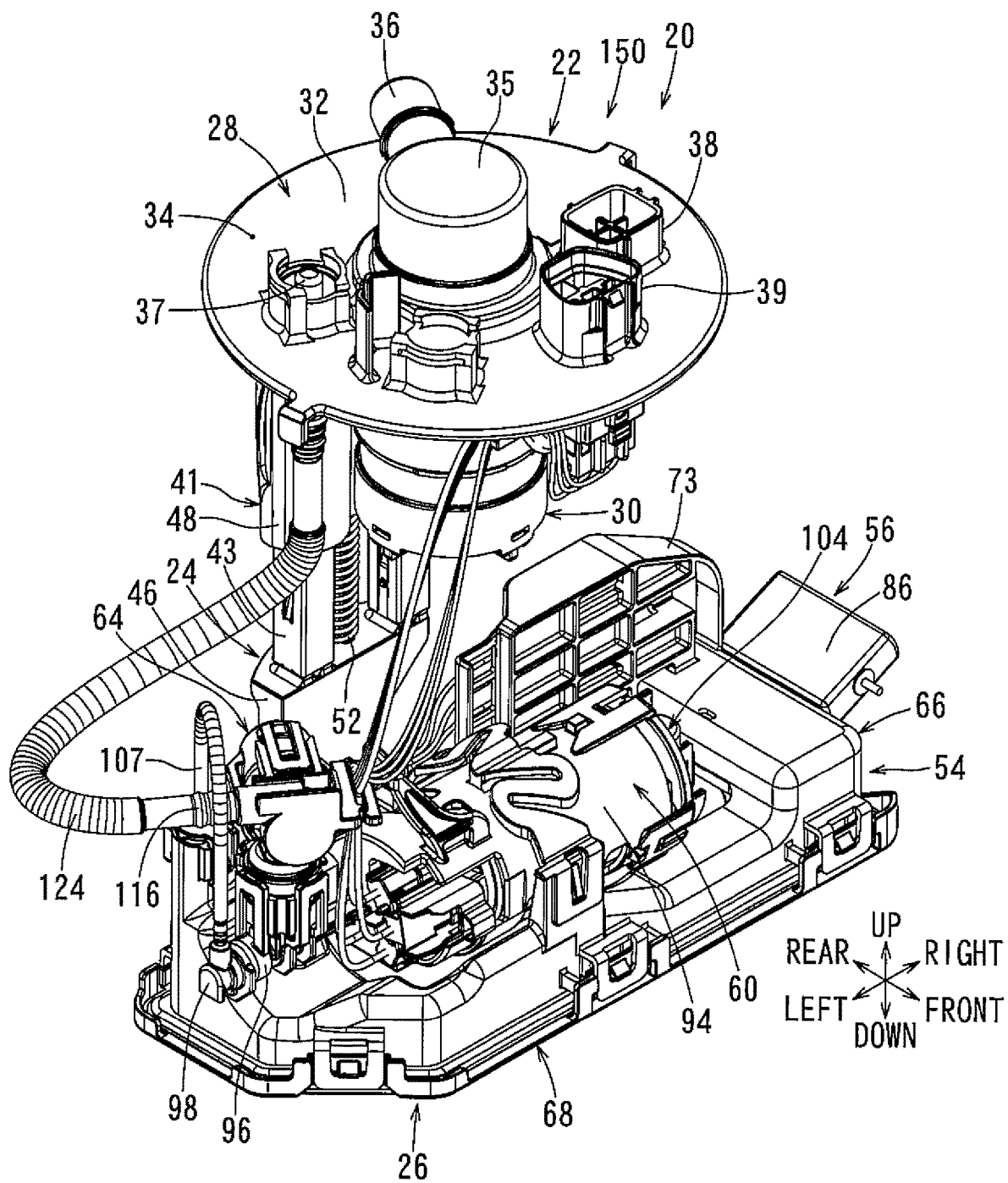
FIG. 1 is a perspective view of a fuel supply device according to a first embodiment.
Figure 2:
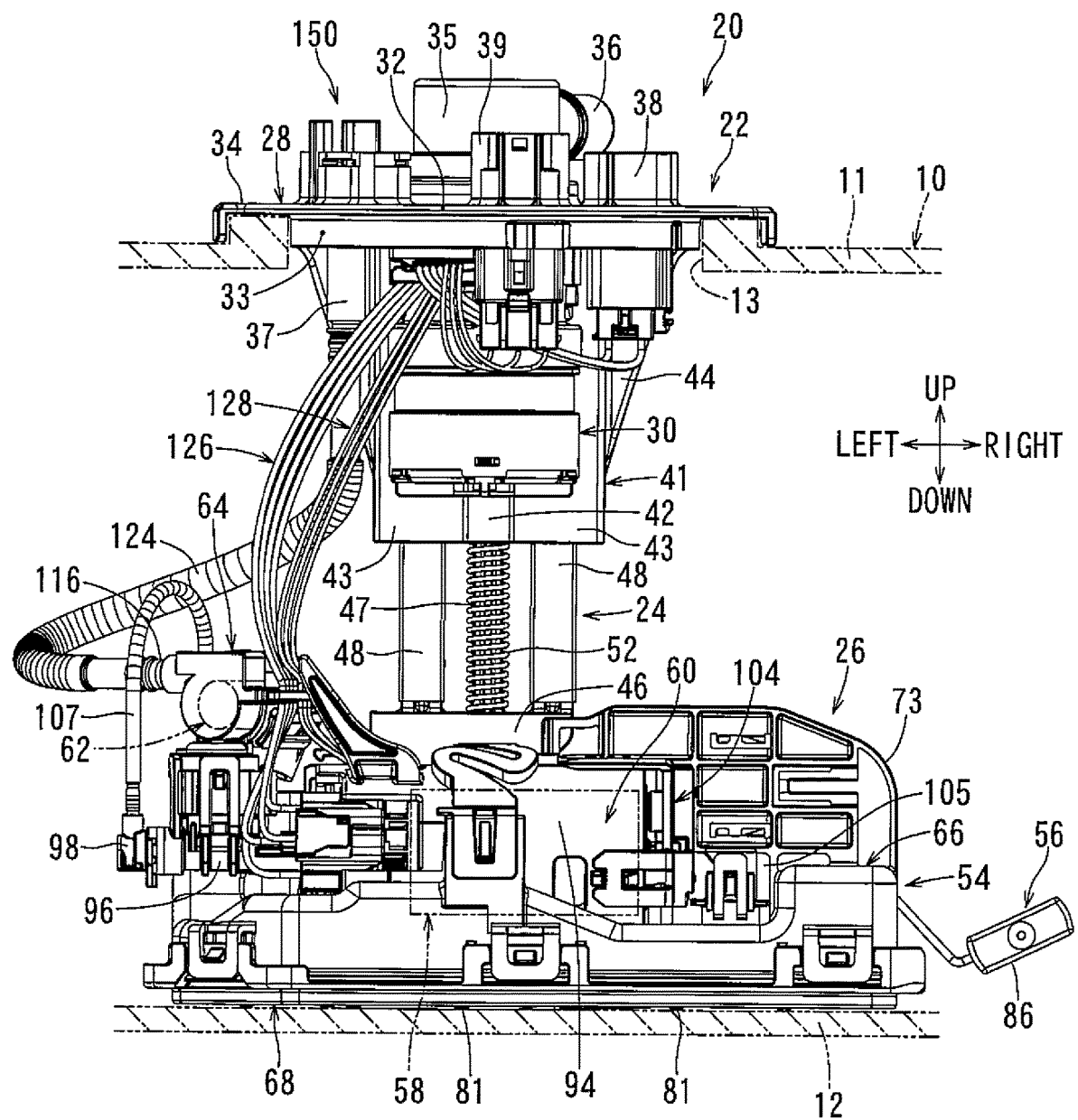
FIG. 2 is a front view of the fuel supply device of FIG. 1.
Figure 3:
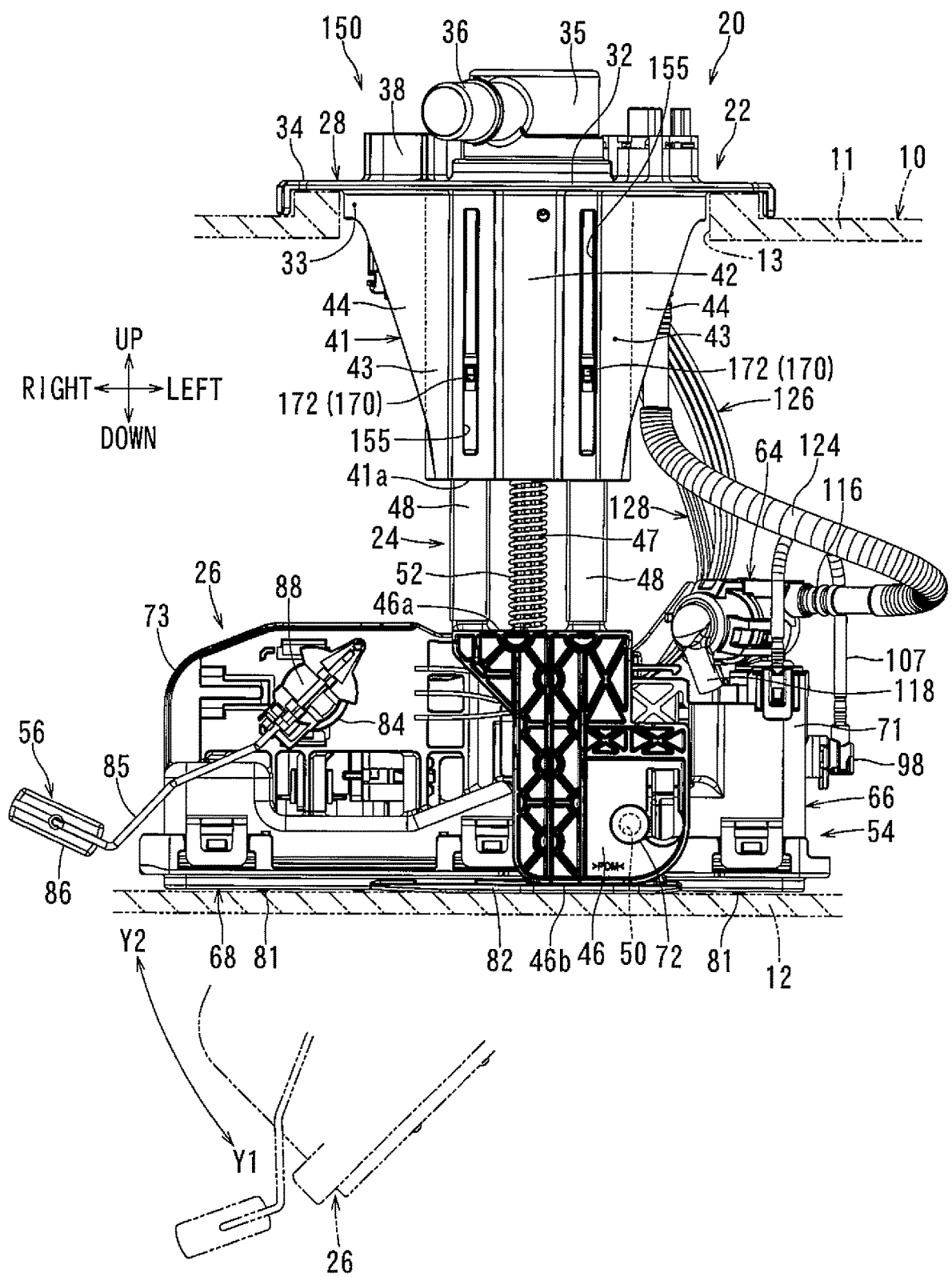
FIG. 3 is a rear view of the fuel supply device of FIG. 1.

A cover for a fuel tank according to the present embodiment may be used for a fuel supply device. The fuel supply device may be installed in the fuel tank mounted on a vehicle (e.g., an automobile or the like) equipped with an engine (e.g., an internal combustion engine), and may serve to supply fuel within the fuel tank to the engine. FIG. 1 is a perspective view of an embodiment of a fuel supply device. FIG. 2 is a front view of the same. FIG. 3 is a rear view of the same. In FIGS. 1 to 3, frontward, rearward, leftward, rightward, upward, and downward directions are shown and correspond to directions of a vehicle. More specifically, a frontward/rearward direction corresponds to a vehicle length direction, leftward/rightward direction corresponds to a vehicle width direction, and upward/downward direction corresponds to a vehicle height direction. The frontward/rearward direction and the leftward/rightward direction of the fuel supply device may be oriented in any direction.

As shown in FIG. 2, a fuel tank 10 may be formed as a hollow container having an upper wall 11 and a bottom wall 12. An opening 13 may be formed as a circular hole in the upper wall 11. The fuel tank 10 may be mounted on a vehicle such that the upper wall 11 and the bottom wall 12 extend horizontally. The fuel tank 10 may be made of resin and may deform (expand or contract mainly in the upward/downward direction) in response to change in tank internal pressure. For example, gasoline as liquid fuel may be stored in the fuel tank 10.

As shown in FIG. 1, a fuel supply device 20 includes a flange unit 22, a joint member 24, and a pump unit 26. The joint member 24 is connected to the flange unit 22 so as to be movable in the upward/downward direction relative thereto, and the pump unit 26 is connected to the joint member 24 so as to be movable in the upward/downward direction relative thereto.

The flange unit 22 includes a flange main body 28 and a fuel vapor valve 30.

The flange main body 28 comprises a cover plate 32 having a circular plate shape. The flange main body 28 may be made of resin. As shown in FIG. 2, a fitting tubular portion 33 having a short cylindrical shape is concentrically formed on a lower surface of the cover plate 32. An annular disc-like flange portion 34 extends radially outward from the fitting tubular portion 33 around an outer periphery of the cover plate 32. A valve housing 35 having a closed-topped cylindrical shape is concentrically formed on the top of the cover plate 32. An evaporation port 36 extends radially outward from an upper end of the valve housing 35.

As shown in FIG. 1, a fuel outlet port 37, a first electric connector portion 38, and a second electric connector portion 39 are provided on the cover plate 32. The fuel outlet port 37 is a straight tube extending through the cover plate 32 in the upward/downward direction. A predetermined number of metal terminals may be disposed in both electric connector portions 38, 39. The fuel outlet port 37 and both electric connector portions 38, 39 circumferentially-spaced around the valve housing 35.

As shown in FIG. 3, a standoff portion 41 is disposed on a rear portion of the lower surface of the cover plate 32. The standoff portion 41 includes a center tubular portion 42, a left side tubular portion 43, and a right side tubular portion 43. The left and right side tubular portions 43 are disposed on opposite sides of the center tubular portion 42. Each tubular portion 42, 43 has a tubular shape extending in the upward/downward direction. The whole of the center tubular portion 42 and both side tubular portions 43 may be formed symmetrically. The center tubular portion 42 and both side tubular portions 43 share wall parts adjacent to each other. Two left and right curved wall portions 44 are symmetrically formed on outer side portions of both side tubular portions 43. The center tubular portion 42 and both side tubular portions 43 are arranged side by side in the leftward/rightward direction. Rear side wall portions of the center tubular portion 42, both side tubular portions 43, and both curved wall portions 44 are continuous with a rear half of the fitting tubular portion 33 of the flange main body 28. In this embodiment, both curved wall portions 44 have substantially triangular shapes, which are tapered downward from the fitting tubular portion 33 as viewed from the back.

As shown in FIG. 2, the fuel vapor valve 30 is attached within the valve housing 35 of the flange main body 28 such that the top portion of the fuel vapor valve 30 is accommodated therein. The fuel vapor valve 30 is an integrated valve having, for example, a fuel vapor control valve and a full-tank regulating valve may be used. The fuel vapor control valve closes when the internal pressure in the fuel tank is smaller than the predetermined value, and opens when the internal pressure becomes greater than the predetermined value. Further, the full-tank regulating valve opens when fuel in the fuel tank 10 is not full, and closes when filled full with fuel.

As shown in FIG. 3, the joint member 24 includes a joint main body 46, a spring guide 47, and a left side columnar portion 48, and a right side columnar portion 48. The joint main body 46 may be made of resin, and may be formed in a flat block shape in the frontward/rearward direction. The joint main body 46 has a horizontal upper end face 46a and a horizontal lower end face 46b. An engagement shaft hole 50 extends through a lower portion of the joint main body 46 in the frontward/rearward direction. In this embodiment, the spring guide 47 is formed like a strut on the center of the upper end face 46a of the joint main body 46. Both side columnar portions 48 are formed symmetrically and in a rectangular columnar shape on both left and right ends of the upper end face 46a of the joint main body 46.

A spring 52 comprising a metal coil spring is fitted onto the spring guide 47 of the joint member 24. In this state, the spring guide 47 of the joint member 24 is inserted into the center tubular portion 42 of the flange main body 28 together with the spring 52. Further, both side columnar portions 48 of the joint member 24 are simultaneously inserted into both side tubular portions 43 of the flange main body 28. The side tubular portions 43 and the corresponding side columnar portions 48 are connected by a snap-fit so as to be relatively movable in the axial direction within the predetermined range. Moreover, the flange main body 28 and the joint main body 46 are biased apart (i.e., away from each other) by the spring 52.

Figure 4:
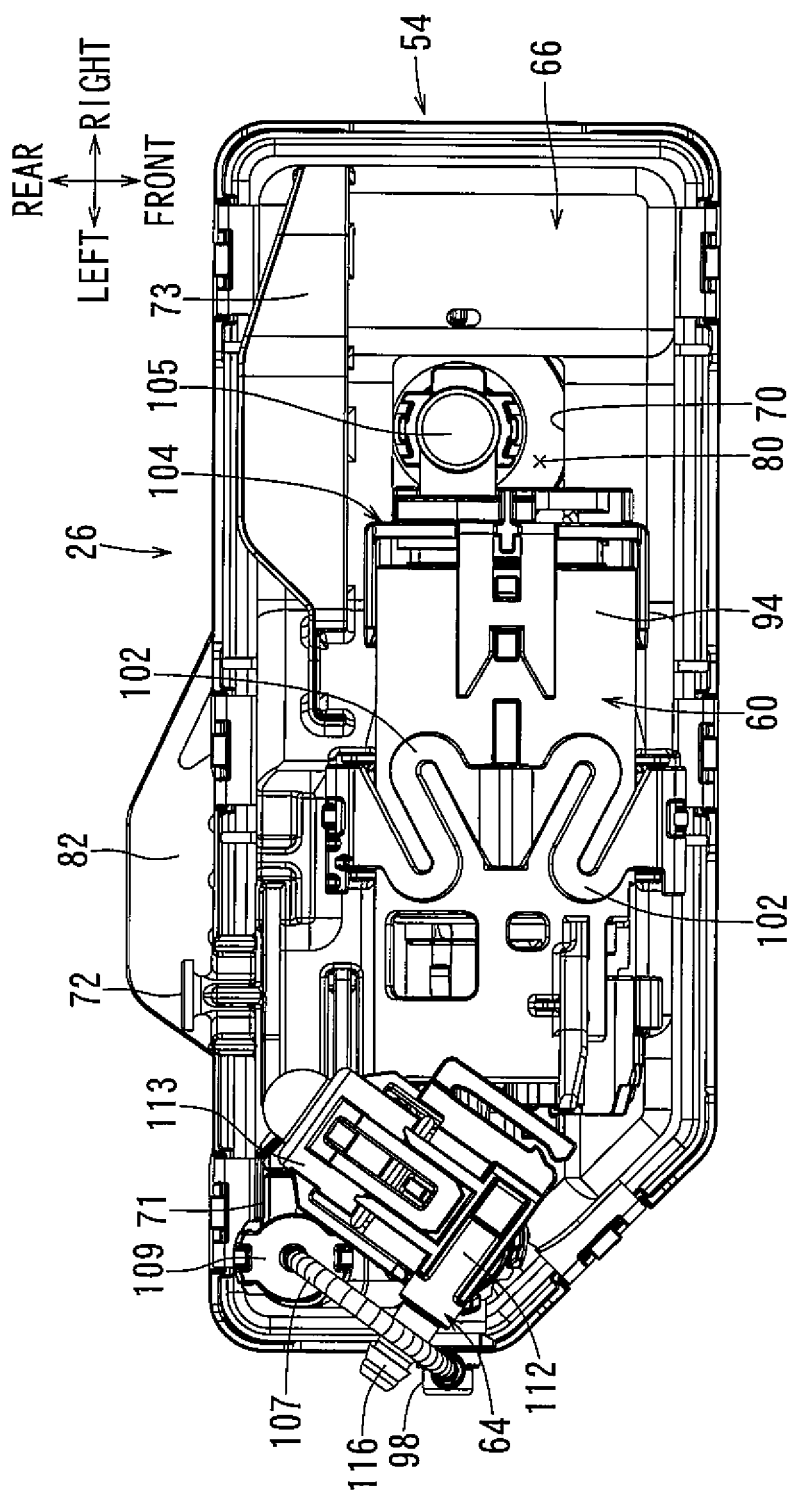
FIG. 4 is a top view of the pump unit of FIG. 1.
Figure 5:
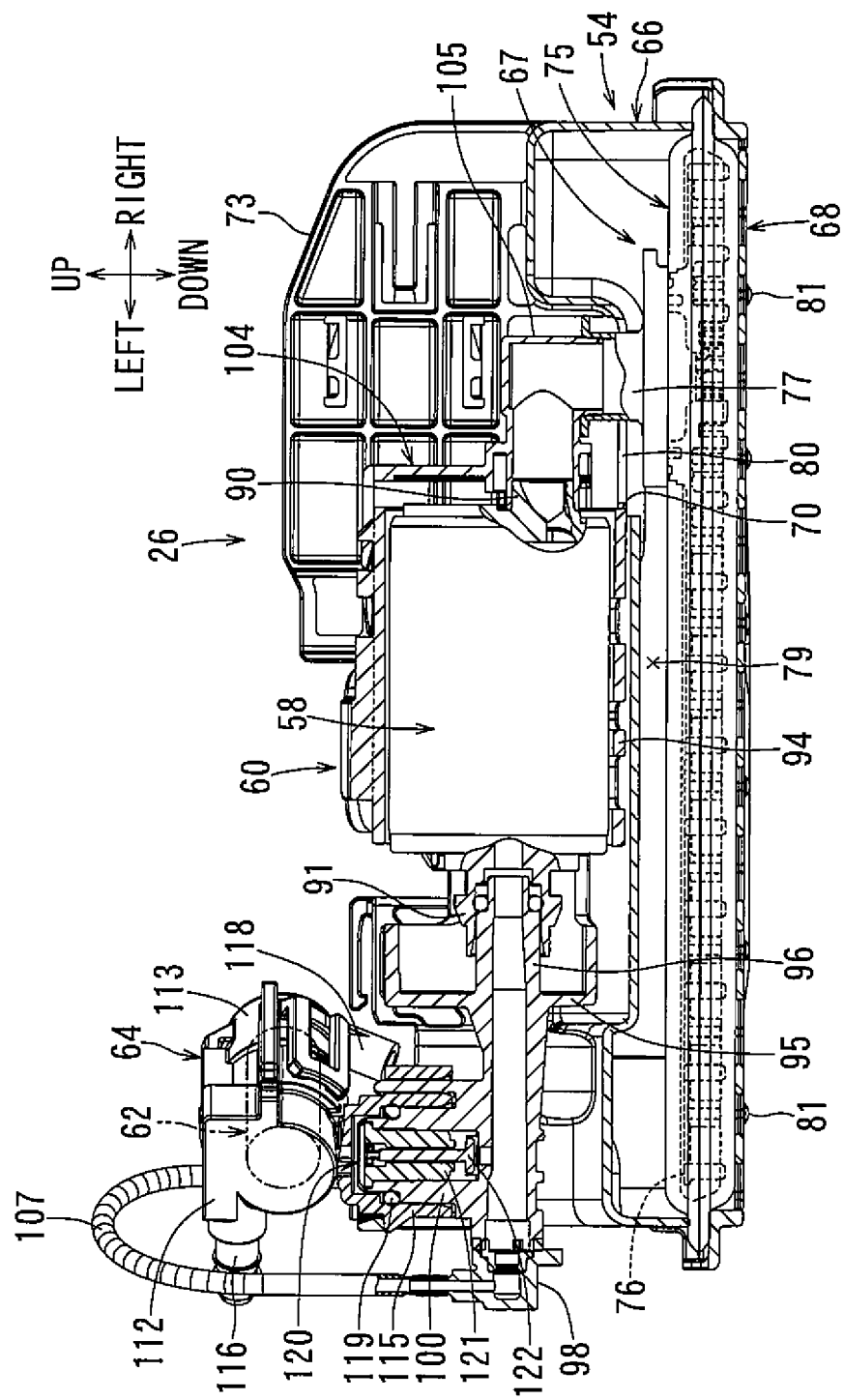
FIG. 5 is a front, partial cutaway view of the pump unit of FIG. 4.

As shown in FIG. 2, the pump unit 26 include a sub-tank 54, a sender gauge 56, a fuel pump 58, a pump case 60, a pressure regulator 62, and a regulator case 64. FIG. 4 is a top view the pump unit 26. FIG. 5 is a partially cutaway front view of the pump unit 26. The sender gauge 56 is not shown in FIGS. 4 and 5.

As shown in FIG. 5, the sub-tank 54 includes a sub-tank main body 66, a fuel filter 67, and a cover member 68.

The sub-tank main body 66 may be made of resin and formed in an inverted shallow box shape with the bottom side opened. In particular, the sub-tank main body 66 may be formed to have a rectangular shape elongated in the leftward/rightward direction in a top view (see FIG. 4). A rectangular opening hole 70 is formed to the right on the top side of the sub-tank main body 66. A fuel receiving tubular portion 71 is formed to the left rear of the top side of the sub-tank main body 66 (see FIG. 4). The fuel receiving tubular portion 71 has a rectangular tubular shape extending upwardly. The top side of the fuel receiving tubular portion 71 is opened.

As shown in FIG. 3, a rearward projecting engagement shaft 72 is provided to the left on a lower portion of the rear side of the sub-tank main body 66 (see FIG. 4). Further, a plate-like upright wall 73 facing the frontward/rearward direction is provided on the right rear portion of the top side of the sub-tank main body 66.

As shown in FIG. 5, the fuel filter 67 includes a filter member 75, an inner frame member 76, and a connecting pipe 77. The filter member 75 has a hollow bag shape with a filter material made of resin non-woven fabric. A contour of the filter member 75 has an elongated rectangular shape, which is flat in the upward/downward direction such that its longitudinal direction corresponds to the leftward/rightward direction.

The inner frame member 76 may be made of resin and have a skeleton structure that retains the filter member 75 in an expanded or inflated state in the upward/downward direction. Further, the connecting pipe 77 may be made of resin and have a vertical round tubular shape. The connecting pipe 77 is joined on the right portion of the inner frame member 76 by heat fusion. An upper side of the filter member 75 is interleaved between the inner frame member 76 and the connecting pipe 77. The inside and the outside of the filter member 75 may be in fluid communication via the connecting pipe 77.

The filter member 75 is arranged so as to close the bottom opening of the sub-tank main body 66. A fuel storage space 79 for storing fuel is provided between the sub-tank main body 66 and the filter member 75. The connecting pipe 77 is disposed within the opening hole 70 of the sub-tank main body 66. An annular space between the opening hole 70 and the connecting pipe 77 defines a fuel flow inlet 80. The fuel in the fuel tank 10 (see FIG. 2) may flow into the fuel storage space 79 through the flow inlet 80 under its own weight.

The cover member 68 has an elongated rectangular plate shape including a plurality of openings. The cover member 68 may be made of resin. The cover member 68 is attached to the sub-tank main body 66 by snap-fitting. A peripheral edge of the filter member 75 is interleaved between peripheral edges of the sub-tank main body 66 and the cover member 68. The cover member 68 covers a lower side of the filter member 75. A plurality of spaced semi-spherical projections 81 are formed on a lower side of the cover member 68. A rotation prevention portion 82 has a horizontal plate shape is formed at a lower end part of a rear side face of the cover member 68.

As shown in FIG. 3, the sender gauge 56 includes a gauge main body 84, an arm 85, and a float 86. The gauge main body 84 is attached to a rear side of the upright wall 73 of the sub-tank main body 66. A base end portion of the arm 85 is attached to a rotating portion 88, which rotatably couples the arm 85 to the gauge main body 84, thereby allowing the arm 85 to rotate about a horizontal axis. The float 86 is attached to a free end portion of the arm 85. The sender gauge 56 is a liquid level meter configured to detect a residual amount of fuel in the fuel tank 10, i.e., a position of the liquid level.

As shown in FIG. 5, the fuel pump 58 may be an electric fuel pump formed in a substantially cylindrical columnar shape. The fuel pump 58 include a motor portion and a pump portion that function to draw, pressurize, and discharge fuel. The fuel pump 58 includes a fuel suction port 90 on a pump portion side end (right end) and a fuel discharge port 91 on a motor portion side end (left end). Further, an electric connector is provided on the motor portion side end of the fuel pump 58. For example, a brushless DC motor may be used for the motor portion.

As shown in FIG. 5, the pump case 60 includes a case main body 94 having a hollow cylindrical shape extending in the leftward/rightward direction. The pump case 60 may be made of resin. An end plate 95 is formed at an opening on one side (a left side opening) of the case main body 94 for closing the opening. A discharge pipe portion 96 comprising a straight tube extends through the end plate 95 and is provided in the center of the end plate 95. A resin pipe joint 98 having an elbow shape is joined at a tip end of the discharge pipe portion 96 by welding. Further, a connecting tubular portion 100 having an upward projecting cylindrical shape is positioned toward the tip end of the discharge pipe portion 96. The inside of the connecting tubular portion 100 is in fluid communication with the inside of the discharge pipe portion 96. The fuel pump 58 is disposed in the case main body 94 with the fuel discharge port 91 oriented to the left. The fuel discharge port 91 is connected to the base end (right end) portion of the discharge pipe portion 96.

As shown in FIG. 4, a pair of front and rear elastic support pieces 102 extending in opposite directions are provided on an upper end of the center of the case main body 94 and symmetrical in the frontward/rearward direction. Both elastic support pieces 102 have a strip shape and are formed in a substantially S-shape in a plan view. The tip ends of both elastic support pieces 102 are attached to both front and rear sides of the sub-tank main body 66 by snap-fitting. The pump case 60 is elastically supported on the sub-tank main body 66 in a horizontal state, i.e., a laterally placed state, by both elastic support pieces 102.

As shown in FIG. 5, a resin cap 104 is attached to the case main body 94 by snap-fitting so as to close a right end opening surface of the case main body 94. A suction pipe portion 105 having an elbow pipe shape is formed on the cap 104. One end (left end) of the suction pipe portion 105 is connected to the fuel suction port 90 of the fuel pump 58. The other end (lower end) of the suction pipe portion 105 is connected to the connecting pipe 77 of the fuel filter 67. The suction pipe portion 105 is attached to the connecting pipe 77 by snap-fitting.

One end of a fuel discharge tube 107 made of a resin flexible tube is connected to the pipe joint 98 by press fitting. A nozzle member 109 is connected to the other end of the fuel discharge tube 107 by press fitting. The nozzle member 109 is attached on a left rear portion of the fuel receiving tubular portion 71 by snap-fitting. The fuel discharge tube 107 may be bent in an inverted U-shape.

As shown in FIG. 5, a contour of the pressure regulator 62 has a substantially cylindrical columnar shape. The pressure regulator 62 serves to regulate the pressure of the pressurized fuel discharged from the fuel pump 58, i.e., the pressure of fuel to be supplied to an engine, at a predetermined pressure.

The pressure regulator case 64 may be made of resin and is formed to have a hollow cylindrical container shape. The regulator case 64 includes a first case half 112 and a second case half 113 divided in the axial direction. The case halves 112, 113 are attached by snap-fitting. The pressure regulator 62 is disposed in the regulator case 64. The regulator case 64 is disposed in a laterally placed state where the axial direction thereof is horizontal.

A cylindrical connected tubular portion 115 projecting downwardly and a fuel discharge portion 116 projecting outwardly from the upper end in the tangential direction are formed on the first case half 112. The connected tubular portion 115 and the fuel discharge portion 116 are in fluid communication with a fuel introduction port of the pressure regulator 62 within the first case half 112.

A discharge pipe portion 118 projecting downward from an end opposite to the first case half 112 is formed on the second case half 113. The discharge pipe portion 118 is in fluid communication with a surplus fuel discharge port of the pressure regulator 62 disposed in the second case half 113. The fuel discharge portion 116 discharges the fuel, of which pressure is regulated in the pressure regulator 62. Surplus fuel from the pressure regulator 62 is discharged through the discharge pipe portion 118.

The connected tubular portion 115 of the regulator case 64 is fitted so as to be connected to the connecting tubular portion 100 of the pump case 60. An O-ring 119 is interposed between the connecting tubular portion 100 and the connected tubular portion 115 for elastically sealing a gap therebetween. Further, the fuel discharge portion 116 is oriented in the rear left direction from the upper end of the first case half 112 (see FIGS. 4 and 5). Furthermore, the discharge pipe portion 118 is oriented to the inside of the fuel receiving tubular portion 71 of the sub-tank main body 66 (see FIG. 3).

As shown in FIG. 5, a check valve 120 is incorporated into the connecting tubular portion 100 of the pump case 60. The check valve 120 may be a residual-pressure retention check valve, which serves to prevent backflow of pressurized fuel in the connecting tubular portion 100. The check valve 120 includes a valve guide 121 and a valve body 122. The valve guide 121 is fixedly disposed within the connecting tubular portion 100. The valve body 122 is disposed in the valve guide 121 so as to be concentric and axially movable (upward/downward direction), i.e., so as to open and close. The valve body 122 may close by its own weight and open by fuel pressure.

As shown in FIG. 3, an engagement shaft 72 of the sub-tank main body 66 is rotatably engaged in an engagement shaft hole 50 of the joint main body 46. As a result, the pump unit 26 is rotatably connected to the joint member 24 in the upward/downward direction (see directions indicated by arrows Y1, Y2 in FIG. 3). The fuel outlet port 37 in the flange main body 28 is connected to the fuel discharge portion 116 at the regulator case 64 via a discharge fuel pipe 124 (see FIG. 2). The discharge fuel pipe 124 may be made of a flexible resin hose or the like. Also, the discharge fuel pipe 124 may be formed in a bellows shape.

As shown in FIG. 2, the first electric connector portion 38 on the flange main body 28 is electrically coupled to an electric connector for the fuel pump 58 via a first wire harness 126. The second electric connector portion 39 on the flange main body 28 is electrically coupled to the gauge main body 84 of the sender gauge 56 (see FIG. 3) via a second wire harness 128. The first wire harness 126 and the second wire harness 128 are attached to a wiring hook portion, which is integrally formed with an adjacent resin member.

The fuel supply device 20 is extended when being installed in the fuel tank 10. In this state, the joint member 24 is suspended by the flange unit 22 while the pump unit 26 is suspended by the joint member 24. Specifically, the joint member 24 is lowered to its lowermost position (farthest position) with respect to the flange unit 22. Further, the pump unit 26 is rotated in an inclined state downward to right (see the arrow Y1 in FIG. 3) of the joint member 24 (see two-dot chain line 26 in FIG. 3).

Subsequently, the pump unit 26 is inserted in the opening 13 of the fuel tank 10 from its top while the fuel supply device 20 is still in its extended state. The pump unit 26 is mounted on the bottom wall 12 of the fuel tank 10 by being rotated relative to the joint member 24 in a direction opposite to that of being suspended (see the arrow Y2 in FIG. 3) so as to be placed horizontally (see FIG. 2). At this point, the rotation prevention portion 82 of the cover member 68 abuts the bottom wall 12 such that the lower end face 46b of the joint main body 46 comes into contact with the rotation prevention portion 82 (FIG. 3), thereby preventing further rotation of the pump unit 26.

The standoff portion 41 of the flange main body 28 is then fitted in the opening 13 of the fuel tank 10 as the flange unit 22 is pressed downward against the biasing force of the spring 52. In this state, the flange portion 34 of the flange main body 28 is fixed to the upper wall 11 of the fuel tank 10 via fixing means (not shown), such as metal fixtures or bolts (see FIG. 2 and FIG. 3), thereby completing installation of the fuel supply device 20 into the fuel tank 10.

The pump unit 26 is biased against the bottom wall 12 of the fuel tank 10 due to the biasing force of the spring 52 in the installed state of the fuel supply device 20 (see FIG. 2 and FIG. 3). Further, the projections 81 on the cover member 68 abut the bottom wall 12 of the fuel tank 10, thereby ensuring flow of fuel between the cover member 68 and the bottom wall 12. Further, a lower end face 41a of the standoff portion 41 of the flange unit 22 faces the upper end face 46a of the joint main body 46 with a predetermined distance therebetween (see FIG. 3).

Incidentally, the fuel tank 10 may deform, i.e., expand or contract in response to a change in the internal pressure of the tank 10 caused by a change in temperature or a change in the amount of fuel. Consequently, the distance between the upper wall 11 and the bottom wall 12 of the fuel tank 10 may vary (increase or decrease). In this case, the flange unit 22 and the joint member 24 move relative to each other in the upward/downward direction so as to follow the change in the height of the fuel tank 10. Further, when the fuel tank 10 attempts to excessively contract, the standoff portion 41 of the flange main body 28 and the joint main body 46 come in contact with each other so as to serve as a tension rod.

A fuel feed pipe leading to an engine is connected to the fuel outlet port 37 of the flange unit 22. External connectors are each connected to the first electric connector portion 38 or the second electric connector portion 39. A fuel vapor piping member leading to a canister is connected to the evaporation port 36. The canister includes adsorbents (for example, activated carbon) capable of adsorbing and desorbing fuel vapor generated within the fuel tank 10.

The fuel pump 58 (see FIG. 5) is driven by an external drive power source. The fuel from the interior of the fuel tank 10 that is to pass through the cover member 68 and/or fuel within the fuel storage space 79 of the pump unit 26 is drawn in by the fuel pump 58 via the fuel filter 67 and pressurized. The pressurized fuel discharged from the fuel pump 58 flows into the regulator case 64 via the discharge pipe portion 96 of the pump case 60, and the pressure of the fuel is regulated by the pressure regulator 62. The pressurized fuel having a regulated pressure is supplied to the engine through the fuel outlet port 37 of the flange unit 22 via the discharge fuel pipe 124 (see FIG. 1).

The surplus fuel resulting from regulation of the fuel pressure with the pressure regulator 62 is discharged through the discharge pipe portion 118 at the regulator case 64 into the fuel receiving tubular portion 71 of the sub-tank main body 66 (see FIGS. 4 and 5). Further, a portion of the pressurized fuel discharged from the fuel pump 58 into the discharge pipe portion 96 of the pump case 60 is discharged into the fuel receiving tubular portion 71 of the sub-tank main body 66 via the fuel discharge tube 107. The fuel vapor generated in the fuel tank 10 is discharged into the canister when a fuel vapor control valve of the fuel vapor valve 30 (see FIG. 1) opens.

Figure 6:
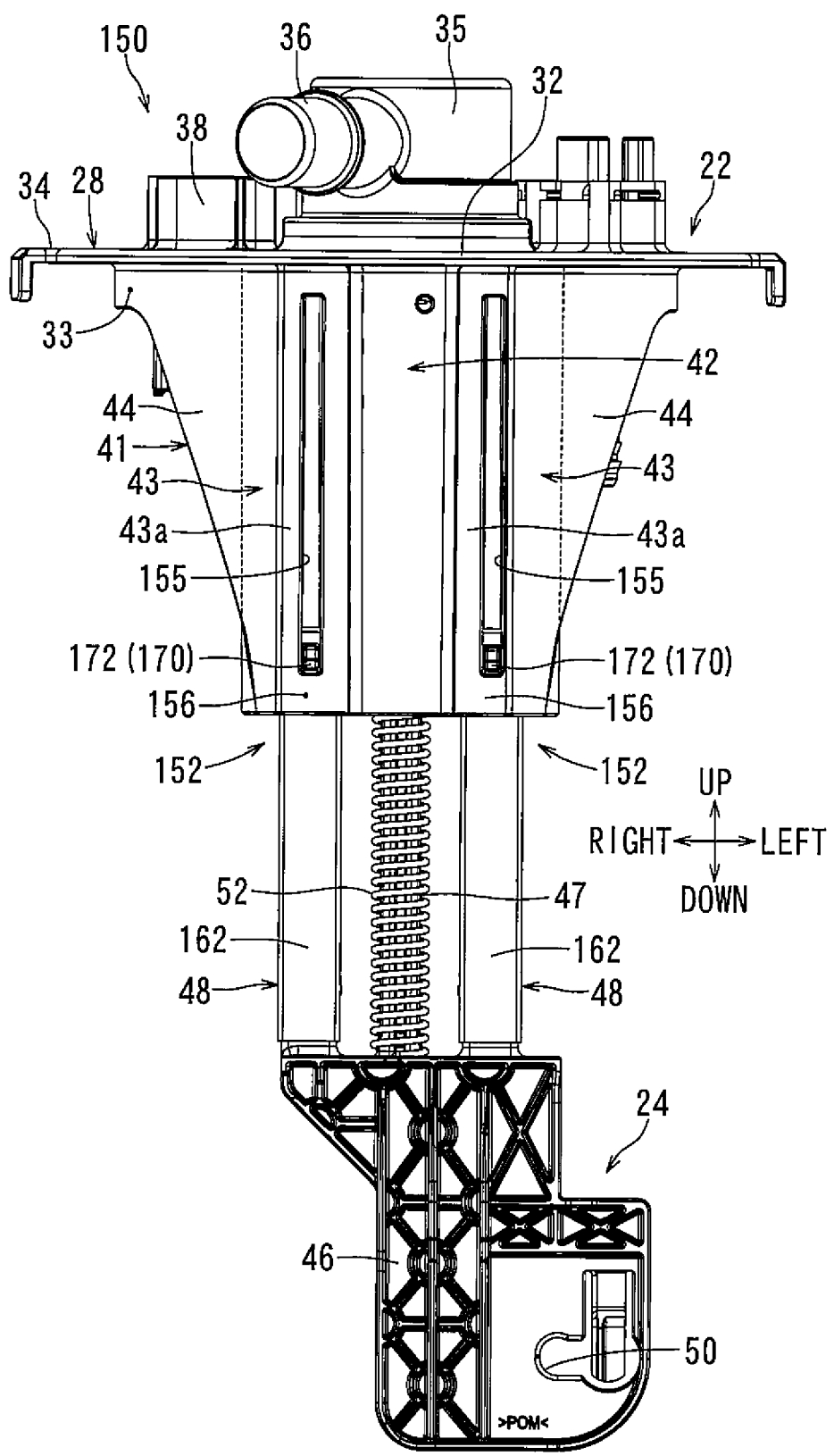
FIG. 6 is a rear view of the cover for the fuel tank of FIG. 1 with a joint member in a suspended state.
Figure 7:
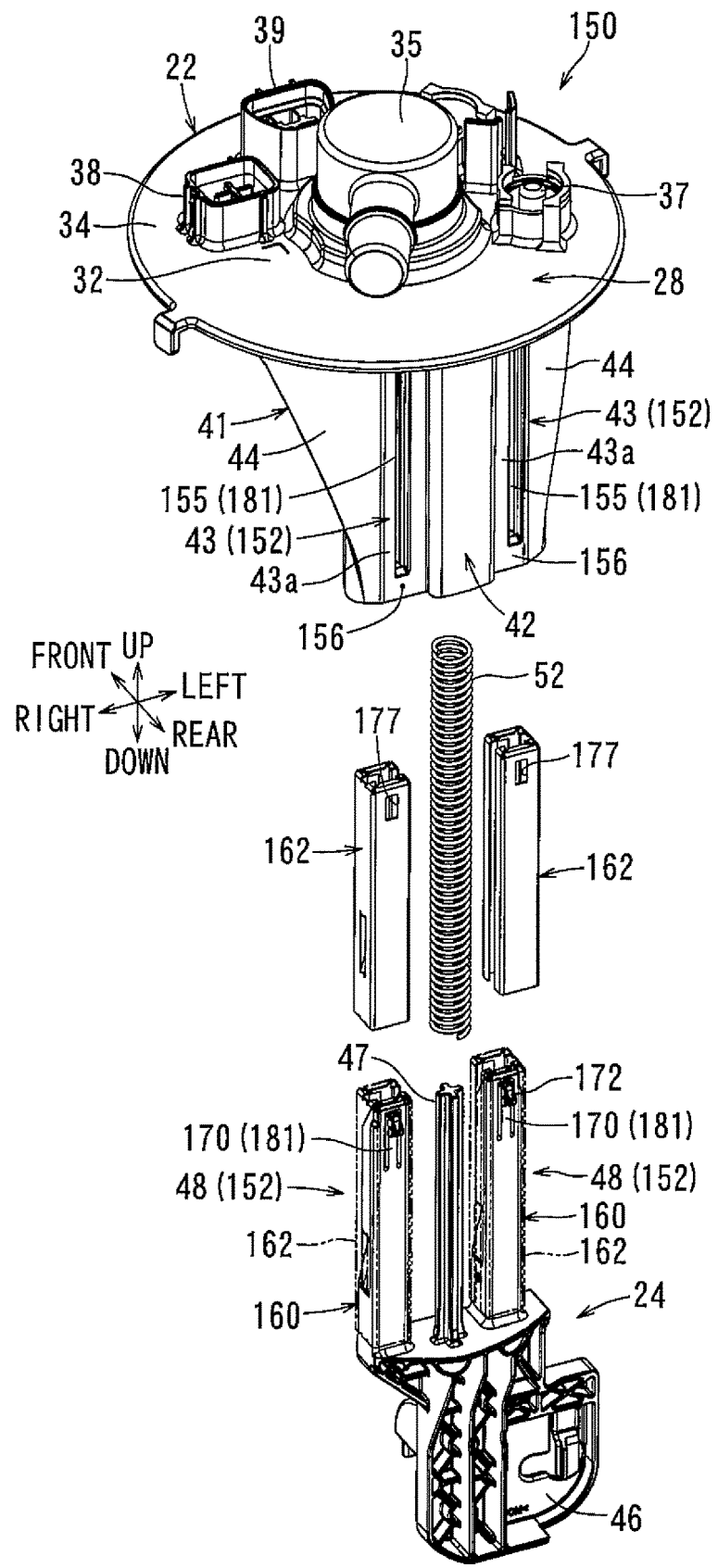
FIG. 7 is a perspective, exploded view of the cover of FIG. 6.

FIG. 6 is a rear view of the cover 150 for the fuel tank 10 with the joint member 24 in a suspended state. FIG. 7 is an exploded, perspective view of the cover 150 for the fuel tank 10. As shown in FIG. 6, the fuel tank cover 150 includes the flange unit 22, the joint member 24, and the spring 52. Further, a connecting mechanisms 152 includes the side tubular portions 43 of the flange unit 22 and the side columnar portions 48 of the joint member 24. Further, since the left and right connecting mechanisms 152 are generally the same, the left connecting mechanism 152 will be described in detail while the right connecting mechanism 152 will be described briefly or will not be described.

The flange unit 22 corresponds to the "cover member" in the present description. In addition, the joint member 24 corresponds to the "connecting member" in the present description. Further, the joint member 24 and the pump unit 26 correspond to the "in-tank component" in the present description. Still further, the joint main body 46 corresponds to a "connecting member main body" in the present description. Moreover, the side tubular portions 43 correspond to the "tubular portions" in the present description.

Figure 8:
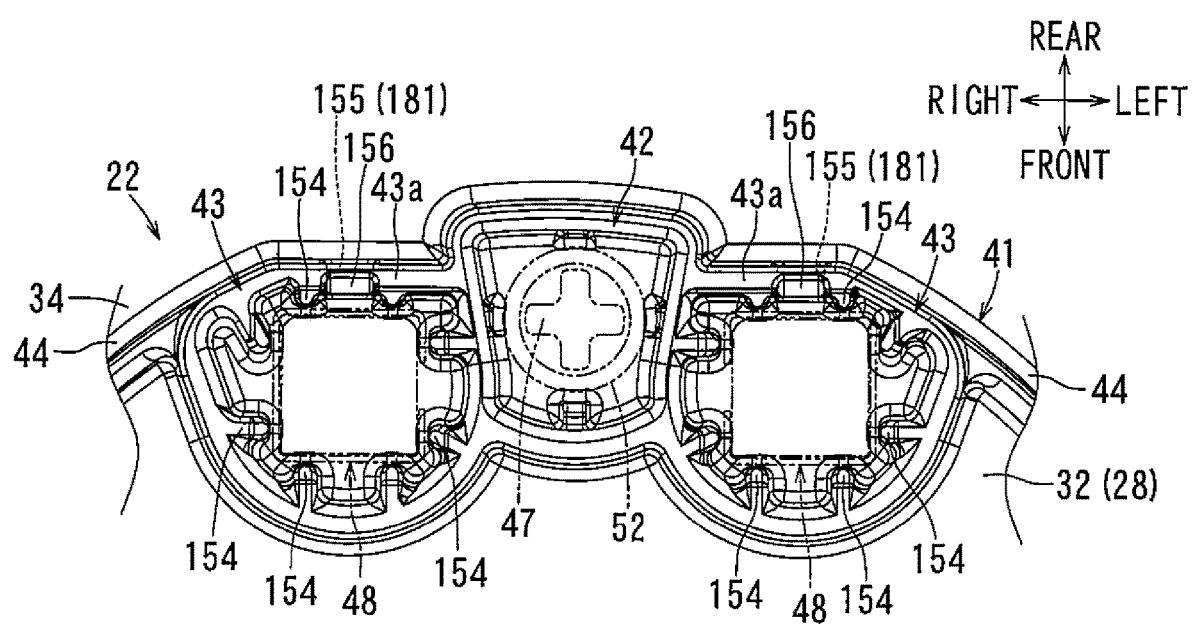
FIG. 8 is a bottom view of the flange unit of FIG. 7 illustrating peripheral parts of side tubular portions.

FIG. 8 is a bottom view illustrating peripheral parts of the side tubular portions 43 of the flange unit 22. As shown in FIG. 8, the side tubular portions 43 have a substantially cylindrical shape in a bottom view of the flange unit 22. A plurality of (eight in FIG. 8) guiding ribs 154 are provided on an inner surface of the side tubular portions 43. The guiding ribs 154 are formed in straight lines extending in the axial direction of the side tubular portions 43, i.e., in the upward/downward direction (in the direction of the front and rear sides of the sheet in FIG. 8). The guiding ribs 154 are arranged at predetermined distances in a circumferential direction. Two adjacent guiding ribs 154 are formed in one set so as to abut or be proximal to two sides of each of projecting corners of the side columnar portions 48.

As shown in FIG. 6, elongated engagement holes 155 extend in the upward/downward direction and are formed on rear side walls 43a of the side tubular portions 43. The edges on the lower end sides of the engagement hole portions 155 may also be referred to herein as hole lower edge portions 156.

Figure 14:
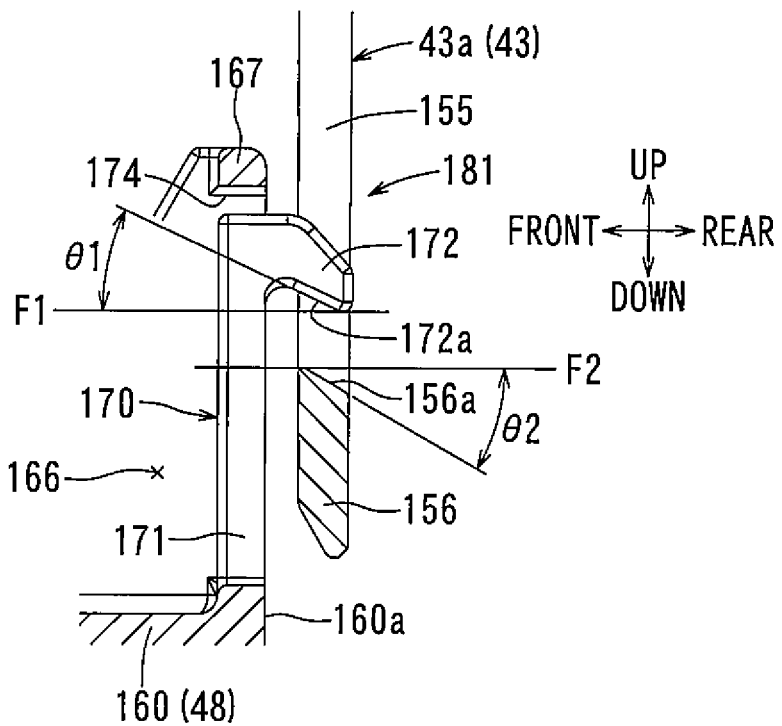
FIG. 14 is an enlarged, side cross-sectional view of the snap-fit between the side columnar portion and the side tubular portion of FIG. 13.

FIG. 14 is the side cross-sectional view illustrating a snap-fit. As shown in FIG. 14, an upper surface 156a of the hole lower edge portion 156 of the engagement hole 155 is inclined downward from an inner end side to an outer end side thereof. An inclination angle $\theta_2$ between the upper surface 156a of the hole lower edge portion 156 and a plane F2 oriented perpendicular to the longitudinal direction of the engagement hole 155 (the upward/downward direction) is set to, for example, 30°.

Figure 9:
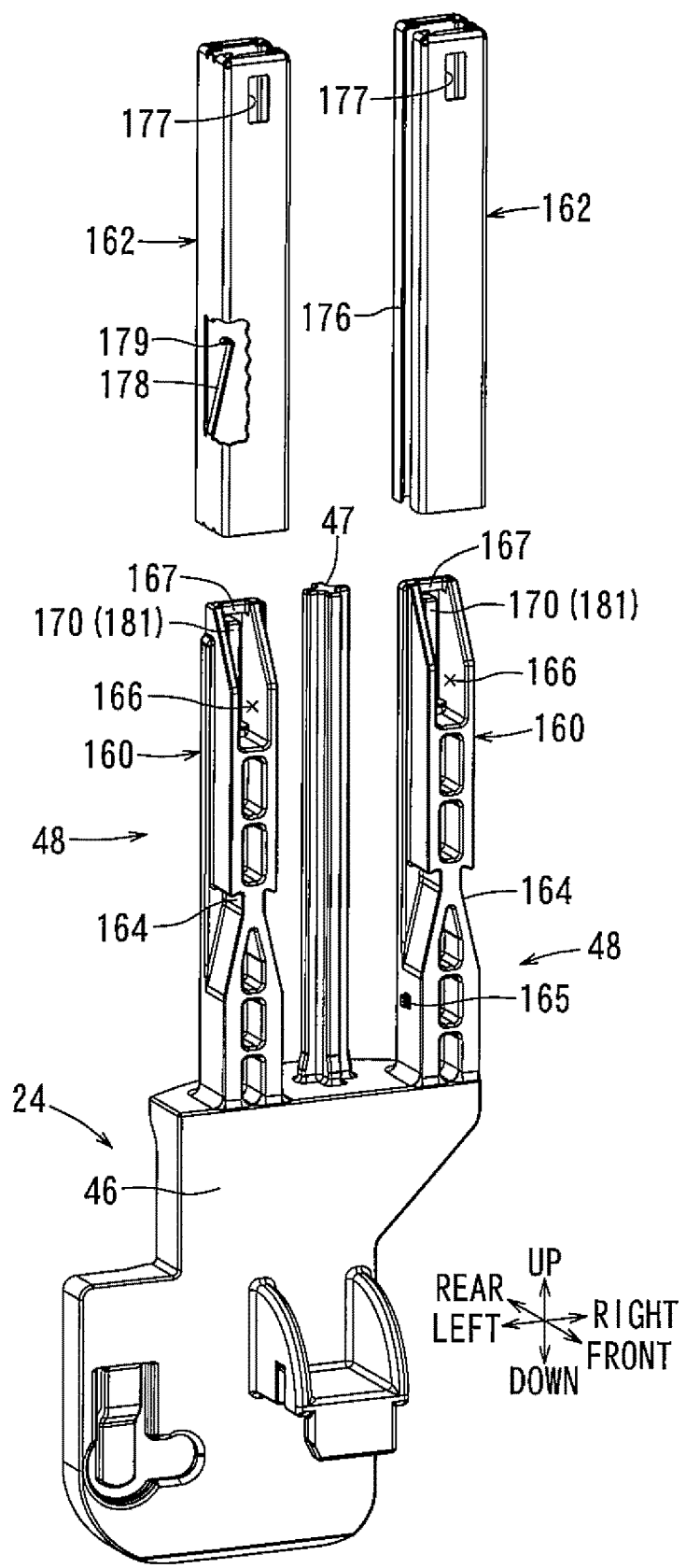
FIG. 9 is a perspective, exploded view of the joint member of FIG. 6.
Figure 10:
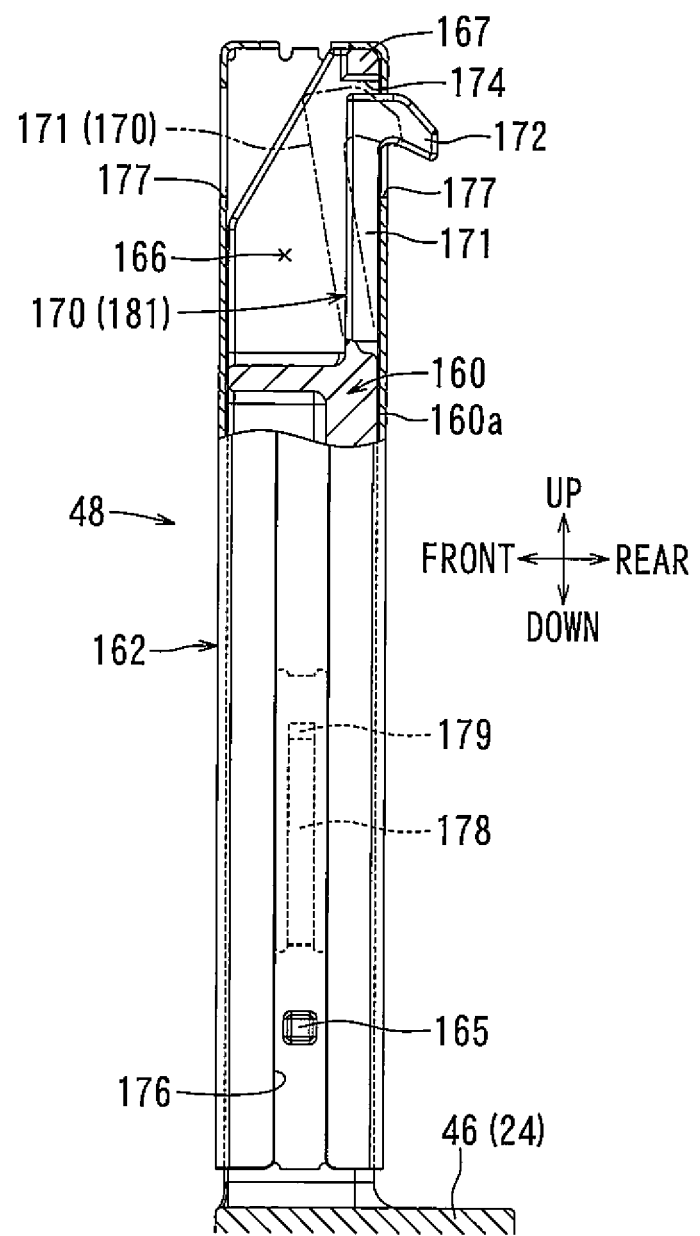
FIG. 10 is a side, partial cutaway view of one side columnar portion of FIG. 9.
Figure 11:
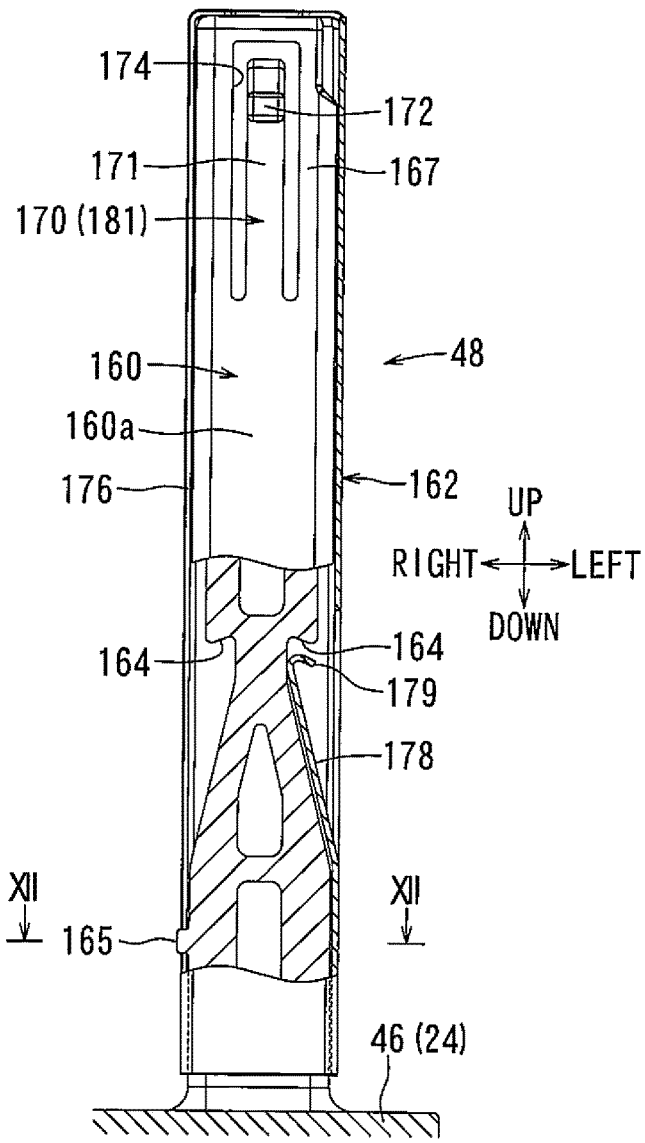
FIG. 11 is a rear, partial cutaway view of one side columnar portion of FIG. 9.
Figure 12:
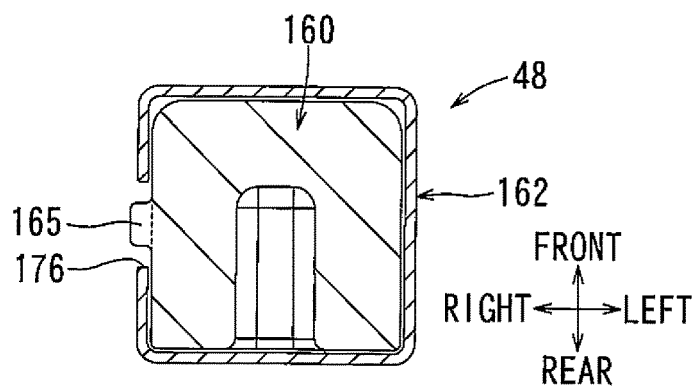
FIG. 12 is a cross-sectional view of the side columnar portion of FIG. 11 taken along line XII-XII in FIG. 11.

FIG. 9 is an exploded, perspective view i of the joint member 24. FIG. 10 is the partial cross-sectional, side view of the side columnar portion 48. FIG. 11 is the rear view of the same. FIG. 12 is the cross-sectional view taken along line XII-XII in FIG. 11. As shown in FIG. 9, the side columnar portion 48 includes a support column portion 160 forming its main body and a retainer 162 covering the outer periphery of the support column portion 160.

The support column portion 160 has a substantially square columnar shape on the joint main body 46 of the joint member 24. Two substantially U-shaped lock grooves 164 are provided on the lower portion of both left and right sides of the support column portion 160 in a symmetrical manner in the rightward/leftward direction (see FIG. 11). Further, a rectangular alignment projection 165 located below the lock groove 164 is formed at a lower end part of an inner side face among both left and right face of the support column portion 160 (a right side face of the left support column portion 160 or a left side face of the right support column portion 160). A recessed groove 166, which has a rectangular groove shape with its front and top sides opened, is provided on the upper end of the support column portion 160. An engagement piece 170 is provided on a rear side wall 167 of the recessed groove 166 (see FIG. 10 and FIG. 11). It should be noted that the support column portion 160 corresponds to the "columnar portion" in the present description.

As shown in FIG. 10, the engagement piece 170 includes an engagement piece main body 171 extending upward and being cantilever from the lower end side, and a hook-like engagement claw portion 172 formed on a tip end (upper end) of the engagement piece main body 171. A rear surface of the engagement piece main body 171 is coplanar with the rear surface 160a of the support column portion 160, including the rear side wall 167. The engagement claw portion 172 protrudes rearward from the rear surface of the rear side wall 167.

As shown in FIG. 11, the engagement piece main body 171 is formed by forming a substantially inverted U-shaped opening groove 174 in the rear side wall 167. The engagement piece main body 171 is elastically deformable, i.e., flexibly deformable in an engagement releasing direction of the engagement claw portion 172, i.e., in the direction entering the recessed groove 166 (forward direction) (see two-dot chain line 171 in FIG. 10).

As shown in FIG. 14, the engagement claw portion 172 is inclined downward from the base end side toward the tip end side thereof. An inclination angle $\theta_1$ between a lower surface 172a of the engagement claw portion 172 and a plane F1 oriented perpendicular to a rear side surface 160a of the support column portion 160 is set to, for example, 25°. The inclination angle $\theta_1$ and the inclination angle $\theta_2$ are set such that the inclination angle $\theta_1$ is less than the inclination angle $\theta_2$. The lower surface 172a of the engagement claw portion 172 faces the upper surface 156a of the hole lower edge portion 156 of the engagement hole 155.

As shown in FIG. 9, the retainers 162 have a substantially square tubular shape and may be formed by bending a metal plate material by press molding. The retainers 162 are sized and shaped so as to be fitted on the support column portions 160. A counter recess 176 extending in the axial direction in the center of the side plate at a predetermined width may be formed between both circumferential end edges of each retainer 162 (see FIG. 12). The counter recess 176 corresponds to the alignment projection 165 on the support column portion 160.

Window holes 177 have a rectangular shape and are provided in the center of the upper end of the side plate adjacent to the side plate with the counter recess 176 of each retainer 162 in a symmetrical manner (see FIG. 10). A locking piece 178 is formed at the lower portion of the side plate on the side opposite to the counter recess 176 of each retainer 162 (a left side plate of the retainer 162 corresponding to the left support column portion 160 or a right side plate of the retainer 162 corresponding to the right support column portion 160), and are formed in an obliquely cut and raised manner in the retainer 162 (see FIG. 11). The locking piece 178 is formed in a cantilever manner with a lower end as a base end and an upper end defining a locking end 179. The locking end 179 is bent so as to be folded back to the opposite side to the cut and raised direction. Further, the upper end of the retainer 162 is bent such that the upper end opening is narrowed (see FIG. 9).

As shown in FIG. 10, the retainer 162 is slid over the support column portion 160. When the counter recess 176 of the retainer 162 is aligned with the alignment projection 165 of the support column portion 160, the alignment projection 165 moves into the counter recess 176 such that the retainer 162 is fitted to the support column portion 160 without interference with the alignment projection 165. Furthermore, the retainer 162 fitted to the support column portion 160 is aligned by the support column portion 160 in the frontward/rearward direction as well as the leftward/rightward direction.

However, if the counter recess 176 of the retainer 162 is not aligned with the alignment projection 165, the retainer 162 interferes with the alignment projection 165 of the support column 160, thereby preventing the retainer 162 is prevented from being fitted onto the support column portion 160. This generally prevents the retainer 162 from being incorrectly assembled with the support column portion 160. In the case of incorrect assembly, the retainer 162 can be reassembled with the support column portion 160. Accordingly, the counter recess 176 of the retainer 162 is positioned to the inside the support column portion 160 (on the side of the spring guide 47) (see FIG. 9). As a result, the retainer 162 is prevented from being expanded and deformed due to an external force exerted from outside in the leftward/rightward direction in the event of a vehicle collision etc., thereby preventing the breakage of the support column portion 160.

Further, when the retainer 162 is fitted to the support column portion 160, the locking piece 178 is pushed and elastically flexed back by the lateral side of the support column portion 160. The locking piece 178 is elastically restored when the fitting of the retainer 62 is completed such that the locking end 179 of the locking piece 178 is locked in the lock groove 164 (see FIG. 11). As a result, the retainer 162 is prevented from detaching from the support column portion 160. It should be appreciated that a retainer mounting snap fit for mounting the retainer 162 to the support column portion 160 is formed by the support column portion 160 having the lock groove 164 and the locking piece 178 having the locking end 179.

Further, when the retainer 162 is fitted to the support column portion 160, the engagement claw portion 172 of the engagement piece 170 is pushed and elastically flexed back to the side of the recessed groove 166 utilizing the elasticity of the engagement piece 170 by the lateral side of the retainer 162. These components are structured such that the engagement piece 170 is elastically restored when the fitting of the retainer 162 is completed. As a result, the engagement claw portion 172 of the engagement piece 170 projects rearward through the window hole 177 (see FIG. 10).

Figure 13:
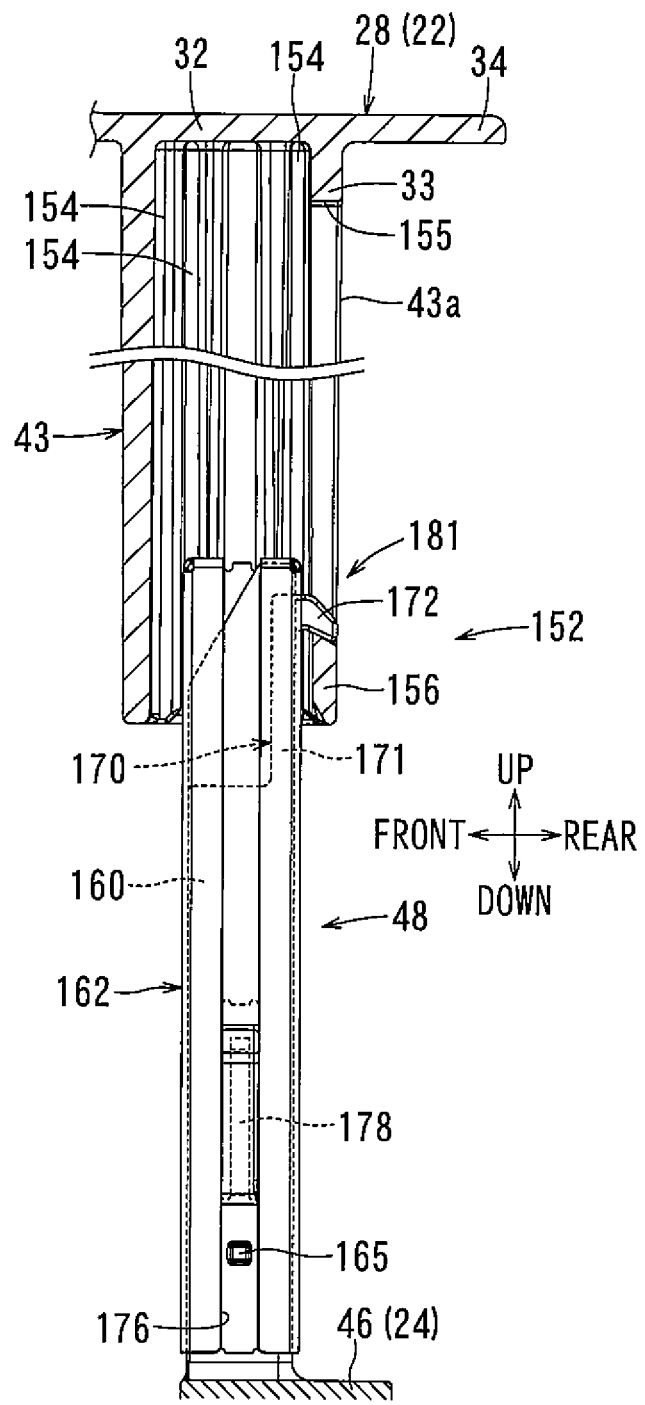
FIG. 13 is a side, partially cutaway view of one side columnar portion and the corresponding side tubular portion of FIG. 6 with the side columnar portion in a suspended state with respective to the side tubular portion.

FIG. 13 is a partially cross-sectional view illustrating a state where the side columnar portion is suspended from the side tubular portion. As shown in FIG. 13, the side columnar portion 48 is inserted into the side tubular portion 43 from the bottom. The engagement claw portion 172 of the engagement piece 170 interferes with the hole lower edge portion 156 of the engagement hole 155 of the side tubular portion 43, and then moves over the hole lower edge portion 156 utilizing the elastic deformation (flexible deformation) of the engagement piece 170. As a result, the engagement claw portion 172 engages with the engagement hole 155 of the side tubular portion 43 so as to be movable within a predetermined range in the upward/downward direction. More specifically, the side columnar portion 48 is connected to the side tubular portion 43 so as to be movable and suspendable in the upward/downward direction. Further, the side columnar portion 48 is coaxially held to the side tubular portion 43 as the respective guiding ribs 154 in the side tubular portion 43 abut to or come close to the lateral sides of each of the projecting corners of the retainer 162 of the side columnar portion 48.

The engagement claw portion 172 of the engagement piece 170 of the support column portion 160 abuts the hole lower edge 156 of the engagement hole 155 of the side tubular portion 43 when the joint member 24 is suspended by the flange unit 22. This prevents the joint member 24 from detaching from the flange unit 22 in the suspended state. It should be noted that a suspension snap fit 181 configured to movably and suspendably connect the support column portion 162 to the side tubular portion 43 in the upward/downward direction is formed by the side tubular portion 43 having the engagement hole 155 and the engagement piece 170 having the engagement claw 172. Further, the engagement claw 172 of the engagement piece 170 is formed such that the tip end thereof does not protrude from the rear surface of the side tubular portion 43.

In accordance with the fuel tank cover 150, the support column portions 160 of the joint member 24 are connected to the side tubular portions 43 of the flange unit 22 by the snap-fits 181 so as to be movable and suspendable in the upward/downward direction, thereby improving the assembly of the joint member 24.

While the support column portion 160 is moved with respect to the side tubular portion 43 in the upward/downward direction, the engagement claw portion 172 of the engagement piece 170 can move in the engagement hole 155 in the upward/downward direction. Further, the engagement claw portion 172 of the engagement piece 170 is brought into contact with the hole lower edge portion 156 of the engagement hole 155, so that the support column portion 160 can be suspended from the side tubular portion 43 and the support column portion 160 is prevented from coming off.

The upper surface 156a of the hole lower edge portion 156 of the engagement hole 155 inclines downward from the inner end side to the outer end side, and the lower surface 172a of the engagement claw portion 172 of the engagement piece 170 inclines downward from the base end side toward the tip end side. Thus, when the engagement claw portion 172 of the engagement piece 170 abuts on the hole lower edge portion 156 of the engagement hole 155, a load acts in a direction in which the hole lower edge portion 156 and the engagement claw portion 172 move close to each other. Therefore, the elastic deformation of the engagement piece 170 in the locking release direction can be suppressed. Accordingly, even when the flange unit 22 is firmly lifted, the support column portion 160 is prevented from being detached from the side tubular portion 43. Consequently, detachment of the joint member 24 from the flange unit 22 is prevented.

As previously described, the inclination angle $\theta_1$ of the lower surface 172a of the engagement claw portion 172 and the inclination angle $\theta_2$ of the upper surface 156a of the hole lower edge portion 156 of the engagement hole 155 are set such that the inclination angle $\theta_1$ is less than the inclination angle $\theta_2$. Consequently, as compared to a case where the inclination angles $\theta_1$, $\theta_2$ are set such that the inclination angle $\theta_1$ is equal to or greater than the inclination angle $\theta_2$, the elastic deformation of the engagement piece 170 in the locking releasing direction can be effectively and stably suppressed when the engagement claw portion 172 of the engagement piece 170 is brought into contact with the hole lower edge portion 156 of the engagement hole 155.

More specifically, for example, in a case where the inclination angle $\theta_1$ is greater than the inclination angle $\theta_2$, the tip part of the engagement claw portion 172 abuts the outer end part of the hole lower edge portion 156 at a point. Thus, the distance from the base end part of the engagement claw portion 172 to the contact point of the hole lower edge portion 156 is relatively long, so that the engagement piece 170 is easily elastically deformed in the locking release direction. In a case where the inclination angle $\theta_1$ is equal to the inclination angle $\theta_2$, the distance from the base end part of the engagement claw portion 172 to the contact point of the hole lower edge portion 156 varies when the support column portion 160 inclines in the frontward/rearward direction due to vehicle vibration, rocking of the fuel in the tank, etc. Thus, the engagement piece 170 is likely to be elastically deformed in the locking release direction. On the other hand, in the case where $\theta 1$ is less than $\theta 2$, the base end part of the engagement claw portion 172 is brought into contact with the inner end part of the hole lower edge portion 156 at a point. Accordingly, when the engagement claw portion 172 of the engagement piece 170 abuts on the hole lower edge portion 156, the load acts in a direction in which the hole lower edge portion 156 and the engagement claw portion 172 are engaged with each other, thereby effectively and stably suppressing the elastic deformation of the engagement piece 170 in the locking releasing direction.

The engagement claw portion 172 of the engagement piece 170 is formed such that the tip part thereof does not protrude from the rear side surface of the side tubular portion 43. Therefore, when inserting the side tubular portion 43 into the fuel tank 10 through the opening part 13, the tip part of the engagement claw portion 172 is prevented from being caught by an opening edge part of the opening part 13.

Two pairs of the coupling mechanisms 152 connecting the flange unit 22 and the joint member 24 are provided on the right and left sides. Therefore, even when the flange unit 22 is firmly lifted, the stress applied to the hole lower edge portion 156 of the engagement hole 155 and the engagement piece 170 of the snap-fit 181 are distributed to both right and left connection mechanisms 152.

Figure 15:
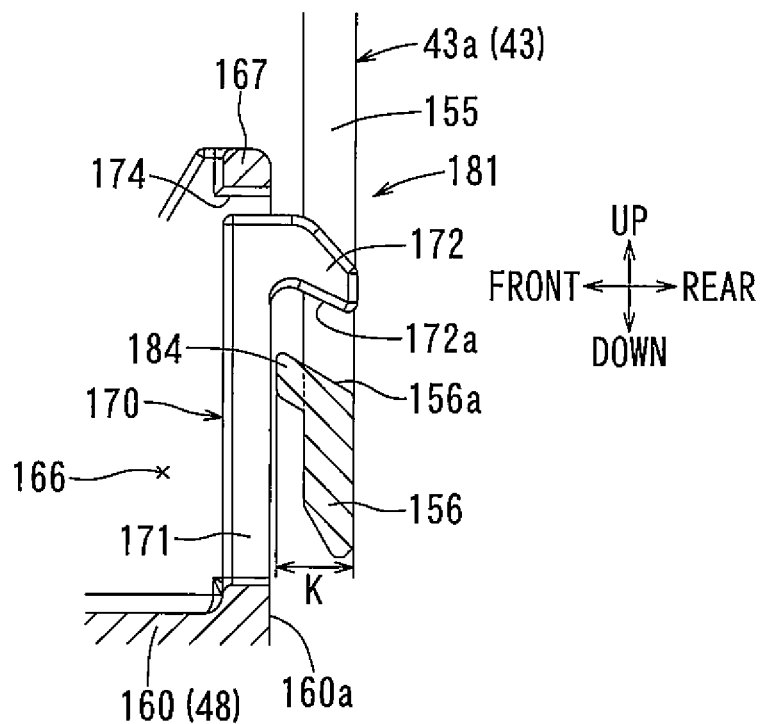
FIG. 15 is an enlarged, side cross-sectional view of a snap-fit between a side columnar portion and a side tubular portion according to a second embodiment.

A second embodiment shown in FIG. 15 is substantially the same as the first embodiment described above (see FIG. 14) with some modifications applied to the snap-fit 181. Accordingly, the modified parts will be described, and redundant explanations will be omitted. FIG. 15 is a side cross-sectional view showing a snap-fit. As shown in FIG. 15, an engagement projection 184 formed in a claw shape may protrude from an upper end part of a front surface side of the hole lower edge portion 156 of the engagement hole 155 of the side tubular portion 43.

According to the present embodiment, an engagement margin K of the hole lower edge portion 156 of the engagement hole 155 with respect to the engagement claw portion 172 of the engagement piece 170 of the support column portion 160 can be increased by the engagement projection 184. Thereby, it is possible to increase the engagement force between the engagement claw portion 172 and the hole lower edge portion 156 of the engagement hole 155 in a state where the support column portion 160 is suspended by the side tubular portion 43.

Figure 16:
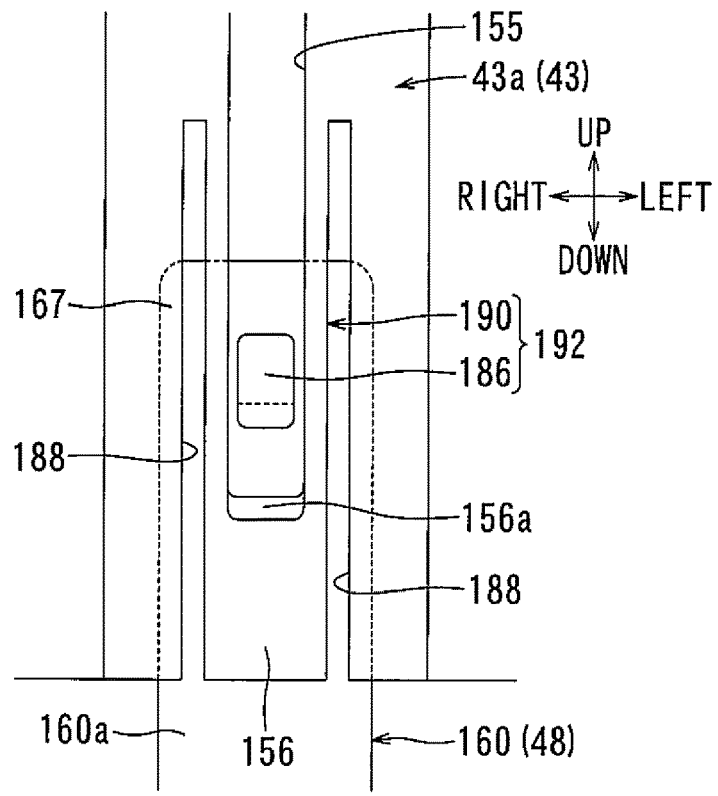
FIG. 16 is an enlarged, rear view of a snap-fit between a side columnar portion and a side tubular portion according to a third embodiment.
Figure 17:
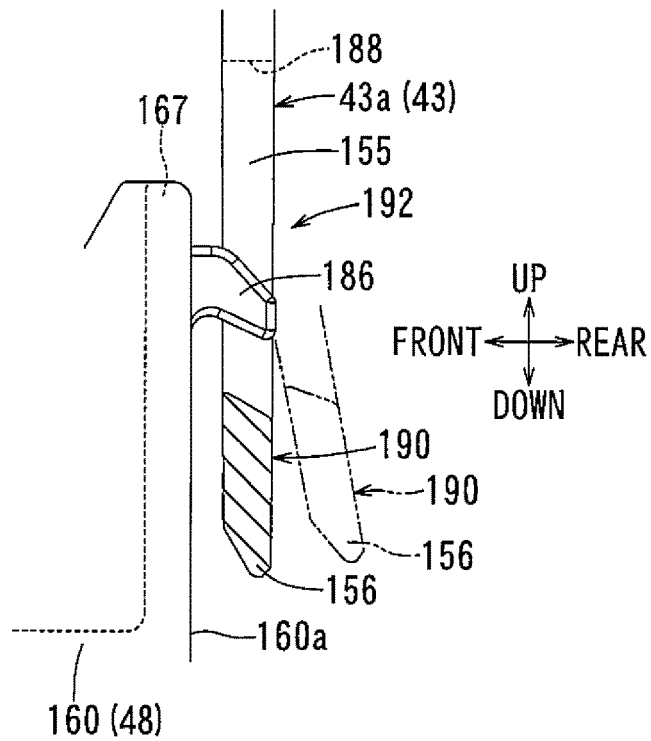
FIG. 17 is an enlarged, cross-sectional side view of the snap-fit of FIG. 16.

A third embodiment shown in FIGS. 16 and 17 is substantially the same as the first embodiment described above (see FIG. 14) with some modifications applied to the snap fit 181. Accordingly, the modified parts will be described, and redundant explanations will be omitted. FIG. 16 is a rear view showing a snap-fit. FIG. 17 is a side cross-sectional view of the same. As shown in FIG. 17, a hook-shaped engagement claw portion 186 projects from the rear side surface 160a of the rear side wall 167 of the support column portion 160 in place of the engagement piece 170 of the first embodiment (see FIG. 14). The engagement claw portion 186 has the same shape or substantially the same shape as the engagement claw portion 172 of the first embodiment.

As shown in FIG. 16, on a lower end part of the rear side wall 43a of the side tubular portion 43, right and left grooves 188 are formed on both sides of the engagement hole 155 so as to be close to the engagement hole 155 at predetermined intervals. Both grooves 188 may extend upward from the lower end face of the rear side wall 43a so as to be linear and parallel to each other. A part including the lower end part of the engagement hole 155 between the grooves 188 in the rear side wall 43a is referred to herein as an engagement piece 190. The engagement piece 190 is cantilever and extends downward from the upper end side, and has the hole lower edge portion 156 at a lower end part thereof. The engagement piece 190 is elastically deformable, i.e. flexibly deformable, in a locking release direction of the hole lower edge portion 156, that is, in a direction away from the support column portion 160 (rearward) (see a two-dot chain line 190 in FIG. 17).

In an assembly process of the side columnar portion 48 with respect to the side tubular portion 43, when the side columnar portion 48 is inserted into the side tubular portion 43, the hole lower edge portion 156 of the engagement piece 190 interferes with the engagement claw portion 186, and then moves over the engagement claw portion 186 via elastic deformation (flexible deformation) of the engagement piece 190. Thus, the engagement claw portion 186 is engaged with the engagement hole 155 of the side tubular portion 43 so as to be movable within a predetermined range in the upward/downward direction. That is, the side columnar portion 48 is connected to the side tubular portion 43 so as to be movable and suspendable in the upward/downward direction.

When the side columnar portion 48 is suspended from the side tubular portion 43, the engagement claw portion 186 of the support column portion 160 is brought into contact with the hole lower edge portion 156 of the engagement hole 155 of the side tubular portion 43. The engagement piece 190, which is provided on the side tubular portion 43 and includes at least the lower end part of the engagement hole 155, and the engagement claw portion 186 provided on the support column portion 160 constitute a suspension snap-fit 192 for connecting the support column portion 160 to the side tubular portion 43 so as to be movable and suspendable in the upward/downward direction. In the present embodiment, the retainer 162 of the first embodiment (see FIG. 9) is omitted.

According to the present embodiment, when the support column portion 160 is moved with respect to the side tubular portion 43 in the upward/downward direction, the engagement claw portion 186 of the support column portion 160 can move in the engagement hole 155 in the upward/downward direction. Further, the engagement claw portion 186 abuts on the hole lower edge portion 156 of the engagement hole 155, so that the support column portion 160 can be suspended from the side tubular portion 43 such that the support column portion 160 is prevented from coming off. In the present embodiment, the engagement projection 184 may be formed on the hole lower edge portion 156 of the engagement hole 155 of the side tubular portion 43 similar to the second embodiment (see FIG. 15).

Figure 18:
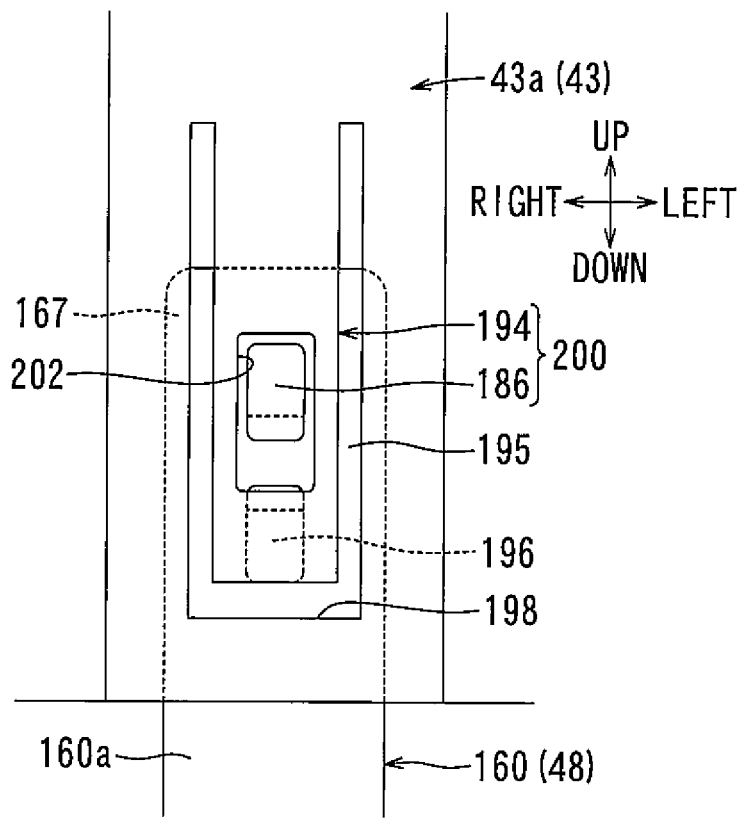
FIG. 18 is an enlarged, rear view of a snap-fit between a side columnar portion and a side tubular portion according to a fourth embodiment.
Figure 19:
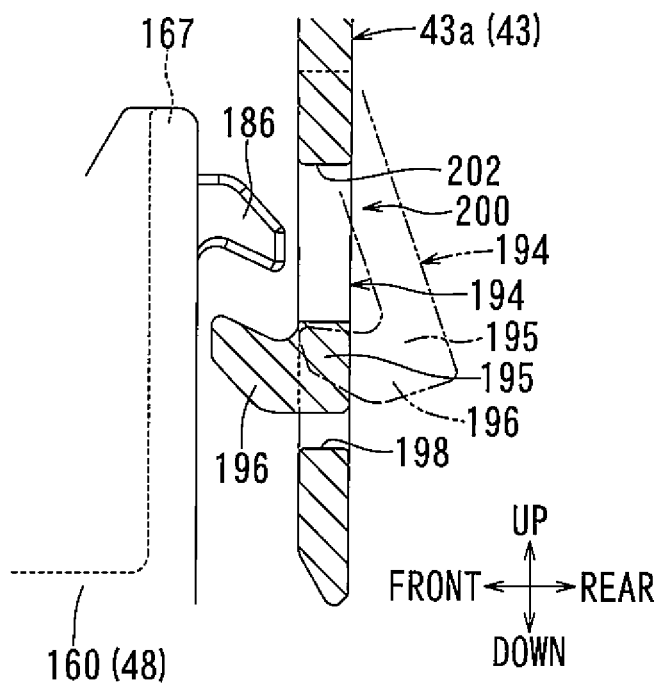
FIG. 19 is an enlarged, side cross-sectional side view of the snap-fit of FIG. 18.

A fourth embodiment shown in FIGS. 18 and 19 is substantially the same as the third embodiment (see FIGS. 16 and 17) with some modifications applied to the engagement piece 190 of the snap-fit 192. Accordingly, the modified parts will be described, and redundant explanations will be omitted. FIG. 18 is a rear view showing a snap-fit. FIG.

19 is a side cross-sectional view of the same. As shown in FIGS. 18 and 19, an engagement piece 194 is provided at the lower end of the rear side wall 43a of the side tubular portion 43 in place of the engagement piece 190 (see FIGS. 16 and 17) of the third embodiment. Further, the engagement hole 155 and the hole lower edge portion 156 of the third embodiment are omitted.

As shown in FIG. 19, the engagement piece 194 includes an engagement piece body 195 being cantilevered and extending downward from the upper end side thereof, and a receiving part 196 protruding in a hook-like shape from the front side of a tip part (lower end part) of the engagement piece body 195. The receiving part 196 is inclined upward from the base end side toward the tip end side thereof.

As shown in FIG. 18, the engagement piece body 195 may be formed by cutting a substantially U-shaped opening groove 198 in the rear side wall 43a of the side tubular portion 43. The engagement piece body 195 is elastically deformable, i.e. flexibly deformable, in a locking release direction of the receiving part 196, that is, in a direction away from the support column portion 160 (rearward) (see a two-dot chain line 195 in FIG. 19). The receiving part 196 is inclined upward from the base end side toward the tip side thereof. An upper surface of the receiving part 196 faces a lower surface of the engagement claw portion 186. A hole part 202 having a square shape is provided in an upper peripheral part of the receiving part 196 of the engagement piece body 195.

In an assembly process of the side columnar portion 48 with respect to the side tubular portion 43, when the side columnar portion 48 is inserted into the side tubular portion 43, the receiving part 196 of the engagement piece 194 interferes with the engagement claw portion 186, and then moves over the engagement claw portion 186 via elastic deformation (flexible deformation) of the engagement piece body 195. As a result, the engagement claw portion 186 is arranged in the side tubular portion 43 so as to be movable in a predetermined range in the upward/downward direction.

When the side columnar portion 48 is suspended from the side tubular portion 43, the engagement claw portion 186 of the support column portion 160 is brought into contact with the receiving part 196 of the engagement piece 194 of the side tubular portion 43. The engagement piece 194 provided on the side tubular portion 43 and the engagement claw portion 172 provided on the support column portion 160 form a suspension snap-fit 200 for connecting the support column portion 160 to the side tubular portion 43 so as to be movable and suspendable in the upward/downward direction.

According to the present embodiment, when the support column portion 160 is moved with respect to the side tubular portion 43 in the upward/downward direction, the engagement claw portion 172 of the support column portion 160 can move within the side tubular portion 43 in the upward/downward direction. Further, the engagement claw portion 172 abuts on the receiving part 196 of the engagement piece 194, so that the support column portion 160 can be suspended from the side tubular portion 43 such that the support column portion 160 is prevented from coming off.

The techniques disclosed herein are not limited to the embodiments described above, and may be modified variously. For example, the embodiments disclosed herein are not limited to the fuel supply device 20 of the vehicle, such as an automobile, and may be applied to other fuel supply devices. The joint member 24 may be fixed to a member on the side of the pump unit 26. Further, the connecting mechanism 152 coupling the flange unit 22 to the joint member 24 is not limited to two sets of right and left, but may be one set or three or more sets. The shape of the support column portion 160 is not limited to a square columnar shape, but may be a round columnar shape. The retainer 162 may be omitted.

The embodiments disclosed herein have various aspects. A first aspect is a cover for a fuel tank, which includes a cover member configured to close an opening of the fuel tank, and a connecting member configured to be connected to the cover member so as to be movable in an upward/downward direction. A tubular portion extending in the upward/downward direction is formed at the cover member. A columnar portion extending in the upward/downward direction is formed at the connecting member. The columnar portion is inserted into the tubular portion so as to be movable in the upward/downward direction. The columnar portion is connected to the tubular portion by a snap-fit so as to be movable and suspendable in the upward/downward direction.

According to the first aspect, the columnar portion of the connecting member is connected to the tubular portion of the cover member so as to be movable and suspendable in the upward/downward direction by the snap-fit, so that assembly of the connecting member can be improved.

A second aspect is the cover for the fuel tank of the first aspect, where the tubular portion and an engagement piece constitute the snap-fit. The tubular portion has an engagement hole. The engagement piece is formed on the columnar portion. The engagement hole has an elongated shape extending in the upward/downward direction. The engagement piece includes an engagement claw portion at a tip end thereof and is formed to be elastically deformable in a locking release direction of the engagement claw portion. The engagement claw portion is engaged in the engagement hole so as to be capable of moving in the upward/downward direction and to abutting on a hole lower edge portion of the engagement hole.

According to the second aspect, when the columnar portion is moved with respect to the tubular portion in the upward/downward direction, the engagement claw portion of the engagement piece can move within the engagement hole in the upward/downward direction. Further, when the engagement claw portion of the engagement piece is brought into contact with the hole lower edge portion of the engagement hole, the columnar portion can be suspended from the tubular portion in a state where the columnar portion is prevented from coming off.

A third aspect is the cover for the fuel tank of the first aspect, where an engagement hole having an elongated shape extending in the upward/downward direction is formed at the tubular portion. An engagement piece and an engagement claw portion constitute the snap-fit. The engagement piece is provided on the tubular portion and including at least lower end part of the engagement hole. The engagement claw portion is provided on the columnar portion. The engagement claw portion is engaged in the engagement hole so as to be capable of moving in the upward/downward direction and abutting on a hole lower edge portion of the engagement hole. The engagement piece is formed to be elastically deformable in a locking release direction of the hole lower edge portion of the engagement hole.

According to the third aspect, when the columnar portion is moved with respect to the tubular portion in the upward/downward direction, the engagement claw portion of the columnar portion can move within the engagement hole in the upward/downward direction. Further, when the engagement claw portion is brought into contact with the hole lower edge portion of the engagement hole, the columnar portion can be suspended from the tubular portion in a state where the columnar portion is prevented from coming off.

A fourth aspect is the cover for the fuel tank of any one of the second and third aspects, where an engagement projection is formed at the hole lower edge portion of the engagement hole so as to increase an engagement margin with respect to the engagement claw portion.

According to the fourth aspect, the engagement margin of the hole lower edge portion of the engagement hole with respect to the engagement claw portion can be increased by the engagement projection. Thereby, the engagement force between the engagement claw portion and the hole lower edge portion of the engagement hole at the time when the columnar portion is suspended from the tubular portion can be increased.

A fifth aspect is the cover for the fuel tank of any one of the second to fourth aspects, where an upper surface of the hole lower edge portion of the engagement hole is inclined downward from an inner end side to an outer end side. A lower surface of the engagement claw portion faces the upper surface of the hole lower edge portion of the engagement hole and is inclined downward from a base end side to a tip end side thereof.

According to the fifth aspect, when the engagement claw portion abuts on the hole lower edge portion of the engagement hole, a load acts in a direction where the hole lower edge portion and the engagement claw portion come close to each other. Therefore, the elastic deformation of the engagement piece in the locking release direction can be suppressed. Accordingly, even when the cover member is strongly lifted, the columnar portion can be suppressed from being detached from the tubular portion. As a result, detachment of the connecting member from the cover member can be prevented.

A sixth aspect is the cover for the fuel tank of the first aspect, where an engagement piece provided on the tubular portion and an engagement claw portion provided on the columnar portion constitute the snap-fit. The engagement piece includes a receiving part capable of engaging with the engagement claw portion. The engagement claw portion is disposed in the tubular portion so as to be capable of moving in the upward/downward direction and abutting on the receiving part. The engagement piece is formed to be elastically deformable in a locking release direction of the receiving part.

According to the sixth aspect, when the columnar portion is moved with respect to the tubular portion in the upward/downward direction, the engagement claw portion of the columnar portion can move within the tubular portion in the upward/downward direction. Further, when the engagement claw portion is brought into contact with the receiving part of the engagement piece, the columnar portion can be suspended from the tubular portion in a state where the columnar portion is prevented from coming off.

What is claimed is:

1. A cover for a fuel tank, comprising:
a cover member configured to close an opening of the fuel tank; and
a connecting member moveably coupled to the cover member such that the connecting member is moveable in an upward/downward direction relative to the cover member, wherein:
the cover member comprises a standoff portion including a tubular portion extending in the upward/downward direction;
the connecting member comprises a connection main body and a columnar portion extending from an upper end face of the connection main body in the upward/downward direction;
the columnar portion is disposed in the tubular portion and configured to be moveable in the upward/downward direction relative to the tubular portion;
the columnar portion is coupled to the tubular portion with a snap-fit such that the columnar portion is moveable relative to the tubular portion and configured to be suspended from the tubular portion in the upward/downward direction;
a lower end face of the standoff portion and the upper end face of the connection main body face ach other; and
when the lower end face of the standoff portion and the upper end face of the connection main body abut each other, relative movement of the cover member and the connection member toward each other is prevented;
the tubular portion and an engagement piece define the snap-fit, wherein the tubular portion includes an engagement hole and the engagement piece is disposed on the columnar portion;
the engagement hole has an elongated shape extending in the upward/downward direction;
the engagement piece includes an engagement claw portion at a tip end thereof and is elastically deformable in a locking release direction of the engagement claw portion; and
the engagement claw portion is engaged in the engagement hole so as to be configured to move in the upward/downward direction and to abutting on a hole lower edge portion of the engagement hole.

2. A cover for a fuel tank, comprising:
a cover member configured to close an opening of the fuel tank; and
a connecting member moveably coupled to the cover member such that the connecting member is moveable in an upward/downward direction relative to the cover member, wherein:
the cover member comprises a standoff portion including a tubular portion extending in the upward/downward direction;
the connecting member comprises a connection main body and a columnar portion extending from an upper end face of the connection main body in the upward/downward direction;
the columnar portion is disposed in the tubular portion and configured to be moveable in the upward/downward direction relative to the tubular portion;
the columnar portion is coupled to the tubular portion with a snap-fit such that the columnar portion is moveable relative to the tubular portion and configured to be suspended from the tubular portion in the upward/downward direction;
a lower end face of the standoff portion and the upper end face of the connection main body face ach other; and
when the lower end face of the standoff portion and the upper end face of the connection main body abut each other, relative movement of the cover member and the connection member toward each other is prevented;
an engagement hole having an elongated shape extending in the upward/downward direction is provided in the tubular portion;

an engagement piece and an engagement claw portion define the snap-fit, wherein the engagement piece is disposed on the tubular portion and includes at least lower end part of the engagement hole, wherein the engagement claw portion is disposed on the columnar portion;

the engagement claw portion is disposed in the engagement hole so as to be configured to move in the upward/downward direction and abut on a hole lower edge portion of the engagement hole; and the engagement piece is elastically deformable in a locking release direction of the hole lower edge portion of the engagement hole.

3. The cover for the fuel tank according to claim 1, wherein an engagement projection is formed at the hole lower edge portion of the engagement hole so as to increase an engagement margin with respect to the engagement claw portion.

4. The cover for the fuel tank according to claim 1, wherein:

an upper surface of the hole lower edge portion of the engagement hole is inclined downward from an inner end side to an outer end side; and a lower surface of the engagement claw portion faces the upper surface of the hole lower edge portion of the engagement hole and is inclined downward from a base end side to a tip end side thereof.

* * * * *